United States Patent
Pujol et al.

(10) Patent No.: US 12,458,035 B2
(45) Date of Patent: Nov. 4, 2025

(54) REMOTE MONITORING OF CONTAMINANT REDUCTION IN INGESTIBLE PRODUCTS

(71) Applicant: Novolyze Inc., Cambridge, MA (US)

(72) Inventors: Laure Pujol, Seurre (FR); Julien Platret, Nuits-Saint-Georges (FR); Karim-Franck Khinouche, Washington, DC (US)

(73) Assignee: Novolyze Inc., Cambridge, MA (US)

( * ) Notice: Subject to any disclaimer, the term of this patent is extended or adjusted under 35 U.S.C. 154(b) by 346 days.

(21) Appl. No.: 17/566,273

(22) Filed: Dec. 30, 2021

(65) Prior Publication Data
US 2023/0210144 A1     Jul. 6, 2023

(51) Int. Cl.
| | | |
|---|---|---|
| *A23B 2/00* | (2025.01) | |
| *A23B 2/10* | (2025.01) | |
| *A23B 2/40* | (2025.01) | |
| *A23B 2/42* | (2025.01) | |
| *A23B 2/792* | (2025.01) | |

(Continued)

(52) U.S. Cl.
CPC ........... *A23B 2/003* (2025.01); *A23B 2/10* (2025.01); *A23B 2/405* (2025.01); *A23B 2/425* (2025.01); *A23B 2/792* (2025.01); *G01N 33/02* (2013.01); *G16H 70/60* (2018.01)

(58) Field of Classification Search
CPC .......... A23L 3/003; A23L 3/015; A23L 3/165; A23L 3/185; A23L 3/3589; A23L 3/00–3/54; G01N 33/02–33/146; A23B 2/003; A23B 2/10; A23B 2/405; A23B 2/425; A23B 2/792; G16H 70/60; G06Q 10/087

See application file for complete search history.

(56) References Cited

U.S. PATENT DOCUMENTS

| | | | | | |
|---|---|---|---|---|---|
| 5,993,886 A | * | 11/1999 | Polster | ............... | A23B 5/0052 99/453 |
| 6,035,647 A | * | 3/2000 | Polster | ............... | A23B 5/04 426/298 |

(Continued)

OTHER PUBLICATIONS

FDA, https://www.fda.gov/inspections-compliance-enforcement-and-criminal-investigations/inspection-guides/sterilizing-symbols-d-z-f (Year: 1972).*

(Continued)

*Primary Examiner* — Drew E Becker
(74) *Attorney, Agent, or Firm* — Lee & Hayes, P.C.

(57) ABSTRACT

Provided herein are techniques, devices, and systems for determining the safety of an ingestible product with respect to a contaminant as the ingestible product is being processed. A computing system may receive data associated with processing of an ingestible product. Based on the data, and using a model, the computing system may determine a value associated with the ingestible product with respect to a target contaminant. Based on the value, the ingestible product can be classified as a class label indicative of a safety of the ingestible product with respect to the contaminant, such as a classification of "safe" or "unsafe." In some examples, a reduction of a contaminant in an ingestible product is dynamically monitored, in real-time, as the ingestible product is being processed.

20 Claims, 11 Drawing Sheets

(51) Int. Cl.
*G01N 33/02* (2006.01)
*G16H 70/60* (2018.01)

(56) References Cited

U.S. PATENT DOCUMENTS

| | | | | |
|---|---|---|---|---|
| 6,410,066 | B1* | 6/2002 | Weng | A23B 2/2055 |
| | | | | 99/325 |
| 8,707,861 | B2 | 4/2014 | Gunawardena et al. | |
| 8,708,861 | B2* | 4/2014 | Inagaki | B25B 23/147 |
| | | | | 475/275 |
| 9,289,002 | B2* | 3/2016 | Lara | A23B 5/0052 |
| 11,000,051 | B2* | 5/2021 | Popp | G06Q 10/00 |
| 11,138,554 | B2* | 10/2021 | Johnsen | G06Q 10/087 |
| 11,234,444 | B1* | 2/2022 | Gunawardena | A23B 2/425 |
| 2002/0163436 | A1* | 11/2002 | Singh | A23G 9/00 |
| | | | | 340/584 |
| 2003/0171943 | A1* | 9/2003 | Stockard | A61L 2/04 |
| | | | | 422/3 |
| 2004/0066314 | A1* | 4/2004 | Souza | G01N 33/04 |
| | | | | 73/52 |
| 2006/0040029 | A1* | 2/2006 | Gunawardena | A23B 2/425 |
| | | | | 426/521 |
| 2009/0117237 | A1* | 5/2009 | Hansen | A61L 2/04 |
| | | | | 99/325 |
| 2014/0065014 | A1* | 3/2014 | Solfa | A61L 2/24 |
| | | | | 422/38 |
| 2015/0010679 | A1* | 1/2015 | Strong | A23L 3/06 |
| | | | | 99/468 |
| 2016/0353757 | A1* | 12/2016 | Lara | A23B 5/0052 |
| 2018/0156768 | A1* | 6/2018 | Bose-Mullick | G01N 33/04 |
| 2018/0360077 | A1* | 12/2018 | Krebs | A61L 2/186 |
| 2019/0274195 | A1* | 9/2019 | Magana | H05B 6/6473 |
| 2020/0345179 | A1* | 11/2020 | Barandun | A47J 37/1219 |
| 2020/0352197 | A1* | 11/2020 | Kaatz | C12H 1/18 |
| 2020/0359659 | A1* | 11/2020 | Toepfl | A23L 2/50 |
| 2021/0017574 | A1* | 1/2021 | Wilhelmsen | C12Q 1/689 |
| 2021/0321819 | A1 | 10/2021 | Baldwin et al. | |
| 2022/0042960 | A1* | 2/2022 | Brunner | G06F 18/2321 |
| 2022/0142167 | A1* | 5/2022 | Rader | A01N 59/00 |
| 2022/0322695 | A1* | 10/2022 | Cocchi | A23G 9/30 |
| 2023/0363425 | A1* | 11/2023 | Stockard | A23B 2/8033 |
| 2024/0019378 | A1* | 1/2024 | Theurer | G01N 33/02 |
| 2025/0081975 | A1* | 3/2025 | Ganick | A23B 2/003 |

OTHER PUBLICATIONS

Bottani, Eleonora et al: "A digital twin model of a pasteurization system for food beverages: tools and architecture", 2020 IEEE International Conference on Engineering, Technology and Innovation (ICE/ITMC), IEEE, Jun. 15, 2020 (Jun. 15, 2020), pp. 1-8, XP033827684, DOI: 10.1109/ICE/ITMC49519.2020.9198625 [retrieved on Sep. 15, 2020] p. 1-p. 6.

The PCT Search Report and Written Opinion mailed Mar. 28, 2023 for PCT application No. PCT/US2022/054176, 12 pages.

* cited by examiner

REMOTE MONITORING OF CONTAMINANT REDUCTION IN INGESTIBLE PRODUCTS

BACKGROUND

Millions of people in the United States get sick each year from foodborne diseases. The Food Safety Modernization Act (FSMA), signed into law by President Obama on Jan. 4, 2011, shifted the focus of food safety to preventing contamination of the food supply, rather than responding to reports of food poisoning. As of today, the food industry is largely ill-equipped to comply with the FSMA's food safety rules aimed at preventing contamination. The disclosure made herein is presented with respect to these and other considerations.

BRIEF DESCRIPTION OF THE DRAWINGS

FIG. 2 also illustrates the collection of data associated with treatment of the food product.

FIG. 3 also illustrates the collection of data associated with treatment of the food product.

DETAILED DESCRIPTION

Figure 1:
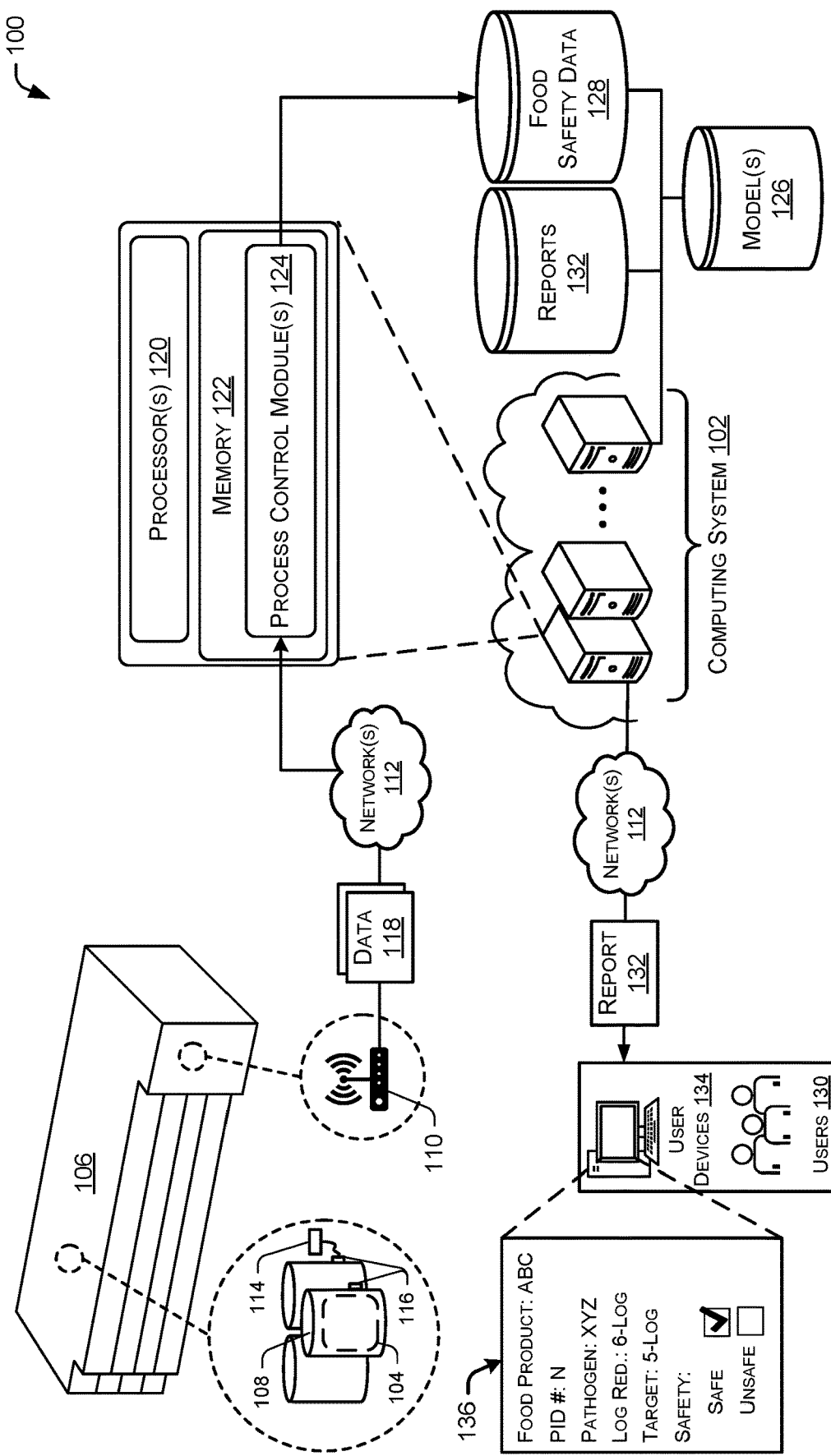
FIG. 1 illustrates an example food safety platform including an example computing system configured to determine the safety of a food product with respect to a pathogen as the food product is being processed.

Described herein are, among other things, techniques, devices, and systems for determining the safety of an ingestible product with respect to a contaminant as the ingestible product is being processed. In some examples, the ingestible product may be a food product, and/or the contaminant may be a pathogen. A "pathogen," as used herein, can be a bacterium, a virus, or another organism (e.g., a parasite) or microorganism (e.g., a microbe) that can cause disease. Consumers who ingest food that is contaminated with a pathogen may get food poisoning, which can manifest in one or more symptoms, such as cramping, nausea, vomiting, diarrhea, or the like. While food poisoning can be mild, some foodborne diseases may result in hospitalization and/or death. Accordingly, populations (e.g., humans, animals, etc.) face a significant public health burden if food contamination is not prevented.

The techniques, devices, and systems described herein provide a food safety platform that is configured to monitor a reduction of a contaminant (e.g., a pathogen) in an ingestible product (e.g., a food product). The reduction of the pathogen may be measured by determining any suitable value or metric, such as a conformity indicator value, associated with the food product with respect to the pathogen. The value or metric, such as a conformity indicator, may be indicative of one or more food safety criteria being satisfied. In some examples, the value or metric may be a reduction metric that measures a reduction of the pathogen of interest. In some examples, the reduction of the pathogen is measured by determining a log reduction value. A "log reduction value," as used herein, is a value that represents the reduction level of a pathogen, and it is sometimes expressed in terms of the log transformation of the colony forming units (log CFU/g) of the targeted pathogen. The log reduction value can be determined based on data received from a device (e.g., a gateway device) in or near a facility where the food product is being processed, and using a model (e.g., a mathematical model, a machine learning model, etc.). The log reduction value can also be determined in real-time (e.g., by repeatedly determining log reduction values at any suitable interval) as the food product is being processed, such as during treatment of the food product within the facility of a food processing entity. This dynamic monitoring capability of the disclosed food safety platform allows a food processing entity to confirm that its food product is safe with respect to a target pathogen, and to do so in real-time, as the food product is being processed, before the food product is distributed to consumers. The techniques, devices, and systems described herein can improve existing technologies used in the food industry for preventing food contamination by providing food processing entities with more food safety information, and by providing the food safety information more frequently and in a timely manner to prevent contamination of a food supply. The disclosed techniques, devices, and systems also provide a reliable system for the retention of food safety data and food safety reports, which allows a food processing entity to easily produce the requisite evidence of compliance to food safety regulating bodies, such as the Food and Drug Administration (FDA) in the United States.

To illustrate, a food processing entity may operate a facility where cocoa liquor is processed for customers who use the processed cocoa liquor to make chocolate products (e.g., chocolate candies, cookies, etc.). Although pathogens are unable to grow in cocoa liquor because of its low moisture content, pathogens, such as *Salmonella*, can remain viable for several months, which poses a potential risk for consumers. Accordingly, the food processing entity may treat the cocoa liquor within its facility in order to reduce a target pathogen, such as *Salmonella*. The disclosed food safety platform can be integrated with the equipment in the food processing entity's facility in order to determine the safety of the cocoa liquor with respect to *Salmonella*, for example. To integrate the food safety platform with the equipment in the facility, a device (e.g., a gateway device)

can be programmed and installed in the facility to collect data from one or more devices involved in treating the cocoa liquor within the facility. Such devices may include programmable logic controllers (PLCs) that control heat treatment of the cocoa liquor, a sensor(s) configured to sense the temperature of the cocoa liquor at various stages during the treatment, or other devices. This data collected by the device can be sent over a network(s) to a remote computing system that is configured to determine, based on the data, and using a model, a log reduction value associated with the cocoa liquor with respect to *Salmonella*. Such a model may be a mathematical model with parameters corresponding to the collected data associated with the treatment of the cocoa liquor. Alternatively, the model may be a machine learning model trained to classify the food product as one of multiple log reduction values based on the data. Based on the log reduction value, the cocoa liquor being treated can be classified as a class label indicative of a safety of the cocoa liquor with respect to *Salmonella*, such as a classification of "safe" or "unsafe." In some examples, a trained machine learning model can output such a classification based on the data provided as input to the model. A user(s) associated with the food processing entity can access the food safety data generated by the food safety platform at any time (e.g., while the cocoa liquor is being processed within the facility) to confirm that the cocoa liquor is in compliance with food safety rules and/or regulations. Moreover, the food safety platform retains the food safety data (as well as food safety reports generated using the food safety data), which allows the food processing entity to easily produce the requisite evidence of compliance to food safety regulators, when it is necessary to do so.

The techniques, devices, and systems described herein also allow a food processing entity to optimize its processes within a food processing facility, resulting in, among other things, higher yield of the food product and/or a lower carbon footprint. That is, resources, such as power resources (e.g., energy), processing resources, memory resources, networking resources, and the like, may be conserved by aspects of the techniques and systems described herein. For example, if the disclosed food safety platform determines that a target reduction level of a pathogen has been reached before completing a treatment of the food product within the facility, the treatment can be stopped early, thereby reduced the environmental impact of processing the food product within the facility through energy conservation. More generally, a food processing entity can use the food safety data and/or food safety reports generated by the disclosed food safety platform for optimizing its processes at any time (e.g., to process food more efficiently), thereby conserving resources.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, mobile telephone devices, tablet computing devices, special-purposed hardware devices, network appliances, and the like. The configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 illustrates an example food safety platform 100 including an example computing system 102 configured to determine the safety of an ingestible product 104 with respect to a contaminant as the ingestible product 104 is being processed. The ingestible product 104 is often referred to herein as a "food product 104" to denote food that is ingestible. However, it is to be appreciated that the ingestible product 104 is not limited to food despite numerous references to "food product 104" herein. FIG. 1 depicts a facility 106, which may represent a food processing facility 106, where a food product 104 is processed. The types of food products 104 that are processed within the facility 106 may vary, and it is to be appreciated that the food product 104 processed within the food processing facility 106 can be any suitable type of food product, such as a meat product, a vegetable product, a fruit product, a dairy product, a beverage product, a grain-based food product (e.g., cereal, snack bars, etc.), a dessert product, a food ingredient (e.g., flour, sugar, cocoa, etc.), or the like. It is also to be appreciated that a food product may be in solid form, liquid form, including powders, flours, or any other suitable form. As such, the term "food product" can mean beverages or drinks, in some examples.

The food product 104 may be at risk of contamination from a contaminant(s), either before the food product 104 is processed within the facility 106 (e.g., after harvesting, while in a holding facility, and/or during transport to the facility 106), or during processing of the food product 104 within the facility. An example of a contaminant is a pathogen. However, it is to be appreciated that the "contaminant," as used herein, is not limited to pathogens despite numerous references to the reduction of a pathogen herein. As such, the term "contaminant" can mean non-pathogen contaminants, such as metals or other contaminants. *Salmonella* is also discussed as an example pathogen herein, but it is to be appreciated that other pathogens may contaminate a food product 104. Example pathogens include *Salmonella, Clostridium perfringens, Campylobacter, Staphylococcus aureus, Escherichia coli, Listeria monocytogenes,* Norovirus, *Toxoplasma gondii*, or any other known or heretofore undiscovered pathogen. The food product 104 may be "processed" within the facility 106 in a variety of ways, such as by cutting, grinding, and/or pulverizing the food product 104, introducing one or more ingredients into the food product 104 (e.g., mixing the food product 104 with water, oil, spices, preservatives, etc.), removing one or more ingredients from the food product 104 (e.g., removing water, caffeine, etc. from the food product 104), heating (e.g., melting, cooking, etc.) and/or cooling the food product 104, and the like.

In addition, processing of the food product 104 may include treating the food product 104 in order to "kill" (e.g., reduce an amount of) a pathogen(s) of interest within the food product 104 as part of a "kill step." Such treatment may represent, or include, heat treatment, chemical treatment, pressure treatment, light (e.g., ultraviolet (UV) light) treatment, or any other suitable type of treatment. With heat treatment, a temperature of the food product 104 is increased to, or above, a threshold temperature. For example, heat treatment may involve increasing the temperature of the food product 104 to, or above, a threshold temperature and maintaining the food product 104 at the elevated temperature for at least a threshold amount of time. In some examples, individual batches of the food product 104 may be heat-treated within a chamber, such as an oven, a tank, or another type of chamber or vessel. In some examples, the food product 104 may be heat-treated while moving on a transport mechanism (e.g., a conveyor, a screw, a vibrating plate, etc.) through an oven, or the like, as part of a continuous treatment process. With chemical treatment, a chemical may be applied to the food product 104. For example, the food product 104 may be loaded into a chamber and a chemical may be introduced into the chamber at a certain concentration, and the chemical may remain in the chamber with the food product 104 for a period of time in order to reduce the amount of the target pathogen within the food product 104. In some examples, a chemical may be sprayed on the food product 104, or the food product 104 may be submerged in a chemical "bath." FIG. 1 depicts the food product 104 disposed within a tank 108 where the food product 104 is being treated (e.g., heat-treated) for pathogen reduction.

FIG. 1 also depicts a device 110 located in or near the facility 106. The device 110 is often referred to herein as a "gateway device 110" to denote a device that is used to connect two different networks, such as a PLC network in the facility and the Internet. However, it is to be appreciated that the device 110 is not limited to a gateway device despite numerous references to "gateway device 110" herein. For example, the gateway device 110 may be disposed within the facility 106, or the gateway device 110 may be disposed outside of the facility 106 and within a threshold distance of the facility 106. The gateway device 110 can be implemented as any type and/or any number of computing devices, including a personal computer (PC), a laptop computer, a desktop computer, a mobile phone, tablet computer, a server computer, a router, an access point, or any other electronic device that can transmit data to, and receive data from, other devices, such as over a wired network(s) and/or wireless network(s). Data can also be sent directly by the PLC(s) or a supervisory control and data acquisition (SCADA) system. Accordingly, FIG. 1 depicts the gateway device 110 as being coupled to a network(s) 112, which may represent, or include, any type of public or private network, such as a wide-area network, such as the Internet, data and/or voice networks, a wired infrastructure (e.g., coaxial cable, fiber optic cable, etc.), a wireless infrastructure (e.g., radio frequencies (RF), cellular, satellite, etc.), and/or other connection technologies. In some examples, the gateway device 110 is configured to establish an authenticated (e.g., encrypted) session with the computing system 102 over the network(s) 112. In examples, secure socket layer (SSL) or transport layer security (TLS) protocol is utilized for communication between the gateway device 110 and the computing system 102. In examples, a virtual private network (VPN) is utilized to establish the authenticated session between the gateway device 110 and the computing system 102. It is to be appreciated, however, that any suitable type of network access technology can be utilized.

The gateway device 110 may be connected to equipment within the facility 106. Such a connection may be a wired connection or a wireless connection. In some examples, the equipment within the facility 106 may include one or more devices, machines, or the like, such as PLCs 114. For example, a PLC 114 is depicted in FIG. 1, the PLC 114 configured to control a temperature inside the tank 108 by causing an element(s) to heat or cool the tank 108 while the tank 108 contains a batch of the food product 104. In some examples, the equipment within the facility 106 may include one or more sensors 116, such as temperature sensors, pressure sensors, pH sensors, and the like. The gateway device 110 may be configured to collect data from any suitable equipment within the facility 106, such as a PLC(s) 114, a sensor(s) 116, and the like. In order to collect data, the gateway device 110 may interface with the equipment (e.g., by plugging a wire cable into the gateway device 110 and the equipment, by the gateway device 110 establishing a wireless connection with the equipment, etc.), as the equipment is being used to treat the food product 104 within the facility.

The data collected by the gateway device 110 may include temperature data indicative of a temperature of the food product 104 being processed (e.g., a temperature of the food product 104 within the tank 108), pressure data indicative of a pressure of a chamber (e.g., the tank 108) containing the food product 104, time data indicative of a time (e.g., an amount of time that has lapsed since starting the treatment of the food product 104, a time of day (e.g., a timestamp, such as a time when the data is collected), etc.), chemical concentration data indicative of a concentration of a chemical applied to, or mixed with, the food product 104, pH data indicative of a pH of the food product 104, or any other suitable type of data associated with the treatment of the food product 104 and/or data relevant for determining a metric, such as a log reduction level, of a pathogen of interest.

The gateway device 110 may be configured to reshape the collected data, such as by normalizing the data, to generate data 118 that is sent to the computing system 102 over the network(s) 112. In some examples, the gateway device 110 is configured to reshape the collected data into messages that contain the data 118, and the gateway device 110 may send the messages to the computing system 102 over the network(s) 112. Moreover, the data 118 (e.g., messages containing the data 118) can be sent in real-time as data is collected and processed by the gateway device 110, or the data 118 can be held (e.g., buffered) for a period of time and subsequently sent periodically to the computing system 102. For example, the data 118 can be sent by the gateway device 110 to the computing system 102 in batches of data at regular intervals, or whenever a network connection is available, or whenever bandwidth is above a threshold, or in response to events (e.g., in response to collecting a threshold amount of data from equipment within the facility 106, in response to collecting data pertaining to a particular stage of the treatment of the food product 104, etc.).

In the illustrated implementation, the computing system 102 includes one or more processors 120, and memory 122 (e.g., computer-readable media 122) storing at least a process control module(s) 124. In some implementations, the processors(s) 120 may include a central processing unit (CPU)(s), a graphics processing unit (GPU)(s), both CPU(s)

and GPU(s), a microprocessor, a digital signal processor or other processing units or components known in the art. Alternatively, or in addition, the functionally described herein can be performed, at least in part, by one or more hardware logic components. For example, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 120 may possess its own local memory, which also may store program modules, program data, and/or one or more operating systems.

The memory 122 may include volatile and nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, compact disk (CD)-ROM, digital versatile disks (DVD) or other optical storage, magnetic cassettes, magnetic tape, magnetic disk storage or other magnetic storage devices, redundant array of inexpensive disks (RAID) storage systems, or any other medium which can be used to store the desired information and which can be accessed by a computing device. The memory 122 may be implemented as computer-readable storage media (CRSM), which may be any available physical media accessible by the processor(s) 120 to execute instructions stored on the memory 122. In one basic implementation, CRSM may include RAM and Flash memory. In other implementations, CRSM may include, but is not limited to, ROM, EEPROM, or any other tangible medium which can be used to store the desired information and which can be accessed by the processor(s) 120.

The computing system 102 can be located remotely from the gateway device 110. The computing system 102 may, in some instances, be part of a network-accessible computing platform that is maintained and accessible via a wide area network. Network-accessible computing platforms such as this may be referred to using terms such as "on-demand computing", "software as a service (SaaS)", "platform computing", "network-accessible platform", "cloud services", "data centers", and so forth. In this manner, the computing system 102 may be configured to provide particular functionality to large numbers of gateway devices 110 associated with different, geographically-disparate facilities 106.

In general, the computing system 102 may include logic (e.g., software, hardware, and/or firmware, etc.) that is configured to implement the techniques, functionality, and/or operations described herein. The memory 122, for example, can include various modules, such as instructions, datastores, and so forth, which may be configured to execute on the processor(s) 120 for carrying out the techniques, functionality, and/or operations described herein. An example functional module in the form of a process control module(s) 124 is shown in FIG. 1.

The computing system 102 is configured to receive the data 118 (e.g., messages containing the data 118) from the gateway device 110 over the network(s) 112, as shown in FIG. 1. The process control module(s) 124 is configured to process the data 118 (e.g., messages containing the data 118) received from the gateway device 110. Processing the data 118 (e.g., messages containing the data 118) by the process control module(s) 124 is described in more detail below with reference to the following figures. In general, the data 118 can be used with (e.g., provided as input to) a model(s) 126 to determine (e.g., estimate) a metric, such as a log reduction value, associated with the food product 104 with respect to a pathogen. That is, the computing system 102 may store one or more models 126 that are usable to estimate a log reduction value of a pathogen in a food product 104 that is being processed within the facility 106. Each model 126 may be specific to a food product 104 and to a pathogen. For example, a model 126 may be specific to cocoa liquor and to *Salmonella* in order to estimate a log reduction value of *Salmonella* in cocoa liquor that is being processed within the facility 106.

In some examples, the model(s) 126 may represent, or include, a mathematical model(s) that define(s) one or more equations including parameters that are usable for determining a log reduction value as described herein. These mathematical model(s) may be developed based on lab trials and/or Thermal Death Time (TDT) studies conducted with respect to the food product 104 and a target pathogen. Continuing with the running example of a food product 104 of cocoa liquor and a target pathogen of *Salmonella*, conducting the TDT studies may involve inoculating the cocoa liquor with *Salmonella* (e.g., multiple strains of *Salmonella*), and heat-treating the inoculated cocoa liquor under similar conditions (e.g., temperature, time, etc.) used within the facility 106 to heat-treat cocoa liquor at industrial scale. Inoculating the cocoa liquor may include inoculating the cocoa liquor until a threshold concentration (e.g., 7-Log CFU/g) of *Salmonella* is present within the cocoa liquor. In some examples, a *Salmonella* strain can be grown on trypticase soy agar (TSA) plates, and incubated at 37° C. for 24 hours. Following incubation, tryptone salt broth can be added to the plate, and the bacterial lawn from each plate can be loosened with a sterile spreader and, using a sterile pipette, transferred to a container. The culture can then be mixed with the cocoa liquor. The inoculated cocoa liquor can be placed in tubes and heated to simulate the heat-treatment within the facility 106 at industrial scale. The TDT studies can evaluate various parameters, such as differing temperatures of heat treatment, differing durations of heat treatment, or combinations of differing temperatures and differing durations of heat treatment. Model parameters (e.g., a D-value and a z-value, as defined in the below Equations (1)-(3)) can be generated using a linear model. The model parameters generated as a result of conducting the TDT studies can be used to create a mathematical model of *Salmonella* reduction (or inactivation) during heat treatment, and this mathematical model can be stored by the computing system 102 as a model 126.

With access to the model 126, the process control module(s) 124 can then determine, in real-time, log reduction values associated with cocoa liquor with respect to *Salmonella* by inputting into the model 126 data 118 received from the gateway device 110, the data 118 being associated with the treatment (e.g., heat treatment) of the cocoa liquor within the facility 106. In this manner, the level of log reduction of *Salmonella* can be determined while the cocoa liquor is being processed within the facility 106. An example mathematical model that is usable to determine a log reduction value associated with cocoa liquor with respect to *Salmonella* may include the following equations:

$$L = 10^{\frac{(T-T_{ref})}{z}} \tag{1}$$

$$\text{Lethality} = L \times t \quad (2)$$

$$\text{Cumulative Log reduction} = \sum \frac{L \times \Delta t}{D} \quad (3)$$

Here, L is the lethal rate, T is the measured temperature (in °C.) (which is extracted from the data 118 received from the gateway device 110), $T_{ref}$ is the reference temperature (in °C.) of the TDT study on cocoa liquor inoculated with *Salmonella*, z is the number of degrees (in °C.) of a TDT curve to traverse 1 log cycle, t is the time (in minutes) (which is extracted from the data 118 received from the gateway device 110), D is the number of minutes for 1-log reduction of the microbial population at the reference temperature, $T_{ref}$. The precision of the log reduction estimation depends on the sampling period ($\Delta t$). Accordingly, as data 118 is received from the gateway device 110, values of T and t associated with heat treatment of cocoa liquor within the facility can be extracted from the data 118 and provided as input to the mathematical model, above, to determine the log reduction with known values of D, z, and $T_{ref}$. It is to be appreciated that similar TDT studies can be conducted on other types of food products 104 with other target pathogens to develop a mathematical model similar to the mathematical model described herein for cocoa liquor as the food product 104 and *Salmonella* as the target pathogen.

In some examples, the model(s) 126 may represent, a machine learning model(s). Machine learning generally involves processing a set of examples (called "training data") in order to train a machine learning model(s). A machine learning model(s), once trained, is a learned mechanism that can receive new data as input and estimate or predict a result as output. For example, a trained machine learning model can be a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained machine learning model can be trained to infer a probability, or a set of probabilities, for a classification task based on unknown data received as input. In the context of the present disclosure, the unknown input may include the data 118 associated with treatment of the food product 104, and the trained machine learning model(s) may be tasked with estimating a log reduction value. For example, the trained machine learning model(s) may be configured to output a classification or a score that indicates, or otherwise relates to, a probability of the food product 104 being classified in one of multiple classes indicative of a log reduction level (e.g., 1-Log, 2-Log, 3-Log, 4-Log, 5-Log, etc.) with respect to the target pathogen. In some examples, the trained machine learning model(s) may be configured to output a float value that represents the log reduction (e.g., 6.25 Log CFU). In this manner, the output of the trained machine learning model(s) may be at any suitable level of granularity, not just integer-level classifications. Additionally, or alternatively, the trained machine learning model(s) may be configured to output a classification or a score that indicates, or otherwise relates to, a probability of the food product 104 being classified in one of multiple classes indicative of a safety of the food product with respect to the pathogen. For instance, the score output from the trained machine learning model(s) may relate to a probability of the food product 104 being safe or unsafe with respect to the target pathogen. The trained machine learning model(s) may represent a single model or an ensemble of base-level machine learning models, and may be implemented as any type of machine learning model. For example, suitable machine learning models for use by the techniques and systems described herein include neural networks (e.g., deep neural networks (DNNs), recurrent neural networks (RNNs), etc.), tree-based models, support vector machines (SVMs), kernel methods, random forests, splines (e.g., multivariate adaptive regression splines), hidden Markov model (HMIs), Kalman filters (or enhanced Kalman filters), Bayesian networks (or Bayesian belief networks), multilayer perceptrons (MLPs), expectation maximization, genetic algorithms, linear regression algorithms, nonlinear regression algorithms, logistic regression-based classification models, or an ensemble thereof. An "ensemble" can include a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble. Accordingly, a trained machine learning model can be stored by the computing system 102 as a model 126. Continuing with the running example of the food product 104 representing cocoa liquor, the process control module(s) 124 can determine, in real-time, log reduction values associated with the cocoa liquor with respect to the target pathogen, *Salmonella*, based on data 118 received from the gateway device 110, the data 118 being associated with the treatment (e.g., heat treatment) of the cocoa liquor within the facility 106.

Thus, using the data 118 and the model 126, the computing system 102 may repeatedly determine log reduction values associated with the food product 104 with respect to a target pathogen, and these log reduction values may be determined at any suitable frequency (e.g., every 10 seconds, every 30 seconds, every minute, etc.) and/or in response to events (e.g., in response to receipt of data 118 relating to the completion of a particular stage of the treatment of the food product 104) as the food product 104 is being processed (e.g., treated) within the facility 106. As log reduction values are determined by the process control module(s) 124, the log reduction values can be stored as food safety data 128. In addition, the raw data 118 received from the gateway device 110 may be stored as the food safety data 128. In a machine learning example, a model 126 can be trained using a sampled subset of this food safety data 128.

In some examples, the log reduction values determined by the process control module(s) 124 can be used to classify the food product 104 as one of multiple class labels indicative of a safety of the food product 104 with respect to the target pathogen, and these class label may be stored as the food safety data 128. A binary "safe or not safe" classification of a food product 104 may be based on whether the log reduction value satisfies a threshold (e.g., a threshold of 5-Log). "Satisfying" a threshold, as used herein can mean meeting or exceeding the threshold, or strictly exceeding the threshold. For example, a threshold of 5-Log may be satisfied by a determined log reduction value of 5-Log, because 5-Log is equal to the threshold in this example. Additionally, or alternatively, a threshold of 5-Log may be satisfied by a determined log reduction value of 6-Log.

Over time, it can be appreciated that a large amount of food safety data 128 can be collected and/or generated as a food product 104 is processed within a facility 106, and this food safety data 128 is thereafter accessible to the computing system 102 and to authorized users 130 associated with a food processing entity that operates the facility 106. In some examples, the process control module(s) 124 is configured to generate reports 132 (e.g., sometimes referred to herein as "food safety reports 132"), which may be sent to one or more users 130 automatically and/or at the request of the user 130.

Users 130 may access the food safety data 128 and/or reports 132 using user devices 134. For examples, the user devices 134 may be configured to send data to, and receive data from, the computing system 102 over the network(s) 112. The user devices 134 can be implemented as any type and/or any number of computing devices, including a PC, a laptop computer, a desktop computer, a PDA, a mobile phone, tablet computer, a set-top box, a game console, a server computer, a wearable computer (e.g., a smart watch, headset, etc.), or any other electronic device that can transmit data to, and receive data from, other devices. In the example of FIG. 1, a user device(s) 134 is shown as receiving a report 132 from the computing system 102. The user(s) 130 who received this report 132 may represent personnel that operate equipment within the facility 106, and/or users 130 who oversee the processing of the food product 104 within the facility 106, and/or users 130 who verify that the food product 104 being processed within the facility 106 is safe before it is distributed to downstream customers and/or consumers. A report 132 may be received and/or displayed by the user device 134 in any suitable digital format, such as an electronic file (e.g., a portable document format (PDF) file), via a web browser, a client application, etc. Users 130 may also be able to print physical (e.g., paper) copies of reports 132. In some examples, the report 132 is interactive (e.g., the users 130 can interact with elements of the report 132 to reveal or hide information, to load curves, generate charts, graphs, or the like). In other examples, the report 132 is static (e.g., not interactive). In either case, the information provided via the report 132 may be unalterable (e.g., a user 130 may be unable to change or manipulate the data so that a report 132 cannot be falsified). In this manner, the report 132 may serve as a reliable source of information (e.g., as evidence) that can be used to demonstrate compliance with rules and/or regulations of a food safety regulating body, such as the FDA in the United States.

FIG. 1 depicts an example user interface 136 that may be displayed on the user device(s) 134. The information displayed on the user interface 136 may represent information that is displayed when a user(s) 130 requests to view the report 132 received by the user device(s) 134. In this example, the report 132 may include information about the food product 104, such as an identifier of the food product (e.g., "Food Product: ABC"), a production identifier (e.g., "PID #: N"), and/or information about a pathogen of interest (e.g., "Pathogen: XYZ"). The report 132 may, additionally or alternatively, include food safety information such as a log reduction value(s) determined by the process control module(s) 124 (e.g., "6-Log") while the food product 104 was being treated within the facility 106, a target log reduction value (e.g., "5-Log"), and/or a class label indicative of a safety of the food product 104 with respect to the pathogen of interest, as well as model parameter values (See Equations (1)-(3), below), in some examples. The food product 104 may be classifiable as "safe" or "unsafe", and, in the example of FIG. 1, the report 132 indicates that PID #N of the food product 104 is safe. The "safe" or "unsafe" classification is merely an example type of classification that can be used, and it is to be appreciated that other class labels may be implemented, such as "conforming" or "non-conforming", "compliant" or "non-compliant", "lethal" or "non-lethal", etc.

Using the food safety platform 100 described herein, a food processing entity can readily confirm that their food product 104 is safe with respect to a pathogen of interest, and this can be done for the food processing entity's entire inventory of the food product 104. That is, log reduction values and/or reports 132 can be generated per batch of the food product 104 to indicate the safety (with respect to a pathogen of interest) of each batch of the food product 104 that is processed within the facility 106. This provides traceability for the food processing entity's food production process, which allows the food processing entity to comply with food safety rules and/or regulations with minimal effort. In particular, the platform's ability to monitor the safety of a food product 104 as the food product 104 is being processed within the facility 106 is an improvement over traditional approaches of merely validating the safety of random samples of a food product.

It is to be appreciated that authorized users 130 associated with a food processing entity may have access to any or all of the food safety data 128 on-demand, which allows for real-time (or "live") display (e.g., on the user devices 134) of parameters (e.g., log reduction values, raw data associated with the treatment of the food product 104, such as temperature data, pressure data, time data, chemical concentration data, pH data, etc.). In some examples, a user 130 associated with the food processing entity may define key performance indicators (KPIs) that the process control module(s) 124 can thereafter evaluate and display for the user 130 via the user interface 136 of the user device 134. In some examples, a user 130 can configure alerts to be sent to a user account and/or a user device 134 if various events occur, such as when a batch of food product 104 is classified as unsafe by the process control module(s) 124. Such an alert can be sent to one or more electronic mail (e-mail) addresses of the users 130, as push notifications to one or more user devices 134, or the like. In some examples, various dashboarding features may allow a user 130 to access the food safety data 128 at any level of granularity, such as on the batch level, to view food safety data 128 associated with a quantity of the food product 104 that is being, or was, processed within the facility 106. In some examples, a user 130 can manipulate the food safety data 128 pertaining to the food product 104 to load curves on a graph, and/or to generate charts, diagrams, etc., which may allow for analyzing trends over time.

Figure 2:
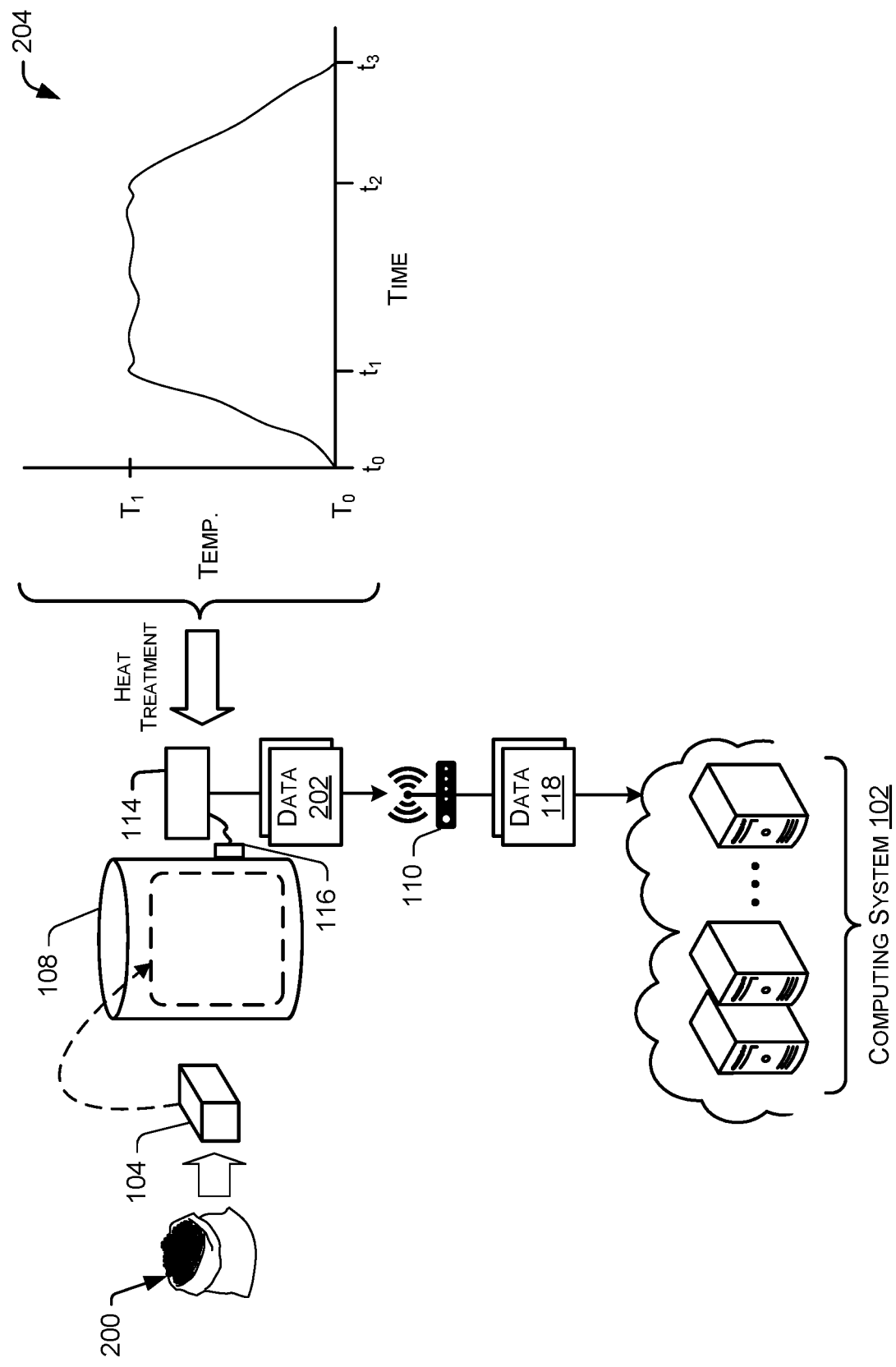
FIG. 2 illustrates a food product being treated to reduce an amount of a pathogen as part of a batch process.

FIG. 2 illustrates a food product 104 being treated to reduce an amount of a pathogen as part of a batch process. In particular, FIG. 2 is an example of applying a heat treatment to a batch of the food product 104. The food product 104 may be any suitable type of food product, as described herein. For illustration, however, the food product 104 may represent cocoa liquor, as described above in the running example. The illustration of the food product 104 in FIG. 2 depicts raw (or unprocessed) cocoa beans 200, which may be processed within the facility 106 (or elsewhere) before the food product 104 is treated (e.g., using heat treatment) within the facility 106. For example, raw cocoa beans 200 may be fermented and dried, and the fermented, dried cocoa beans may be deshelled and ground to form blocks of cocoa liquor in solid form. In some examples, the facility 106 may receive the food product 104 in solid blocks of cocoa liquor. The blocks may be crushed and melted within the facility 106. In order to treat the melted cocoa liquor with respect to a target pathogen, such as *Salmonella*, the cocoa liquor may be loaded into a tank 108, water may be added to the tank 108, and the cocoa liquor/water mixture may be heated within the tank 108 to an elevated temperature for heat-treating the food product 104. The tank 108 may represent a sterilizer tank that is configured to heat the food product 104 using steam.

A PLC 114 may control the heating of the food product 104 within the tank 108, and one or more sensors 116 may detect the temperature and/or the pressure within the tank 108 at any suitable time(s). The PLC 114 may also track time data with respect to the heat treatment, such as a start time of the treatment, an end time of the treatment, a duration of the treatment and/or stages of the treatment, etc. This data 202 (e.g., temperature data, pressure data, time data, etc.) can be collected by the gateway device 110 from the equipment (e.g., the PLC(s) 114, the sensor(s) 116, etc.) as the data 202 is generated. The gateway device 110 may reshape the data 202 into data 118, and the gateway device 110 may send the reshaped data 118 to the computing system 102, which may be located remotely from the facility 106 where the food product 104 is being treated.

FIG. 2 illustrates an example temperature profile 204 of the heat treatment applied to the food product 104 within the tank 108. At time, $t_0$, the temperature of the food product 104 within the tank 108 may increase from a starting temperature, $T_0$, to a target temperature, $T_1$. In some examples, the starting temperature, $T_0$, may be a temperature within a range of about 60° C. to 70° C., and the target temperature, $T_1$, may be a temperature of about 106° C. Water may be added during the warmup phase (e.g., from time, to, to time, $t_1$). This addition of water to the tank 108 increases the liquor moister to a desired percentage (e.g., about 7%). In some examples, the start of the heat treatment may correspond to time, $t_1$, when the temperature reaches the target temperature, $T_1$. In other examples, the start of the heat treatment corresponds to time, $t_0$, when the temperature starts to ramp towards the target temperature, $T_1$. The food product 104 may remain within the tank 108 at the target temperature, $T_1$, for a target duration, which is represented by the time span from $t_1$ to $t_2$. In some examples, this target duration is about 25 minutes. At time, $t_2$, the PLC 114 may cease heating the tank 108, and may cause moisture (e.g., water) to be removed from the tank 108 with a vacuum. The temperature may or may not decrease back to the starting temperature, $T_0$, at a time when the food product 104 is removed from the tank 108. FIG. 2 illustrates an example where the temperature returns to the starting temperature, $T_0$, marking the end of the heat treatment at time, $t_3$, but it is to be appreciated that the end of the heat treatment may be at an earlier time. After completing the heat treatment, the food product 104 may be further processed within the facility 106 (e.g., packaged) and shipped to customers, such as downstream food processing entities, stores that sell the food product 104 to consumers, etc. It is to be appreciated that the data 202 collected during the heat treatment of the food product 104 may be any suitable type of data associated with the heat treatment, such as temperature data, time data, etc. In other examples, the data 202 may include other types of data, such as chemical concentration data indicative of the concentration of the chemical introduced to the food product 104, pH data indicative of the pH of the food product 104, and the like.

Figure 3:
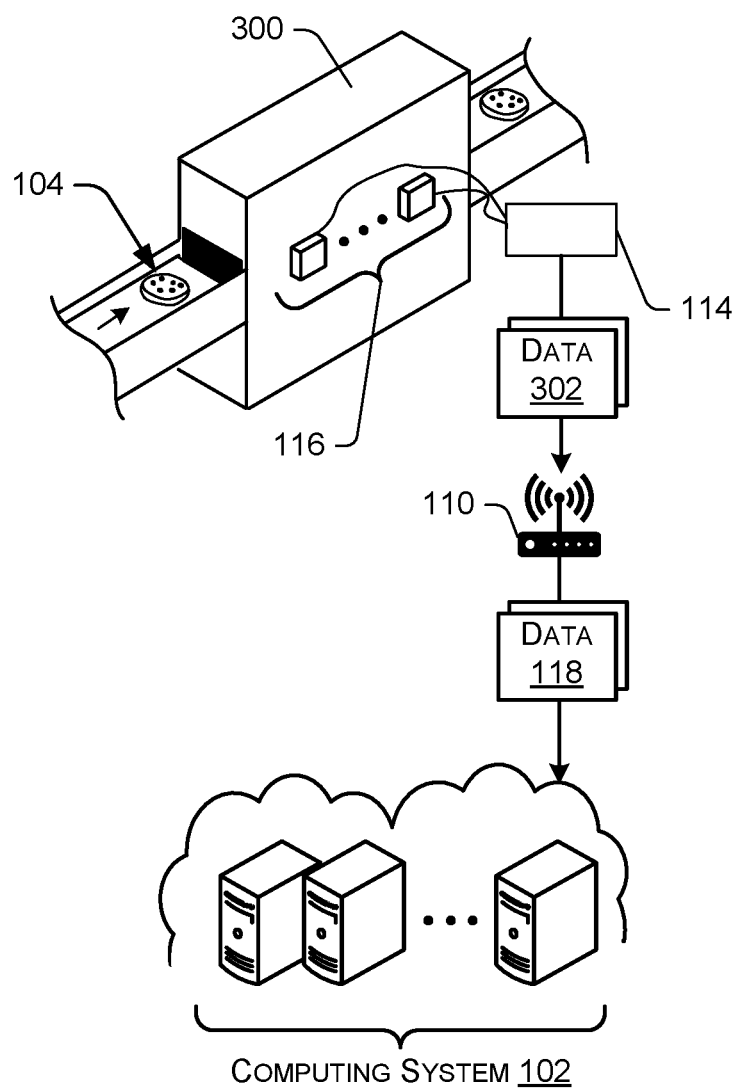
FIG. 3 illustrates a food product being treated to reduce an amount of a pathogen as part of a continuous process.

FIG. 3 illustrates a food product 104 being treated to reduce an amount of a pathogen as part of a continuous process. In particular, FIG. 3 is an example of applying a heat treatment to the food product 104 as portions of the food product 104 move by a transport mechanism (e.g., along a conveyor) in a continuous process. The food product 104 may be any suitable type of food product, as described herein, and it is to be appreciated that the food product 104 may be processed from its raw form before being treated for pathogen reduction in the continuous process shown in FIG. 3. In the example of FIG. 3, the food product 104 is moved by a transport mechanism (e.g., on a conveyor) through an oven 300 in order to treat the food product 104 to reduce the target pathogen. Thus, at any given time, some of the food product 104 may be located at the entrance of the oven, some of the food product 104 may be within the oven 300, and some of the food product 104 may be at the exit of the oven.

A PLC 114 may control the temperature of the oven 300 in order to heat-treat the food product 104 within the oven 300, and one or more sensors 116 (e.g., sensors fixed at known positions) may detect the temperature(s) within the oven 300 at any time(s) and/or at any location(s) within the oven 300. In some examples, different sensors 116 may be positioned along the length of the oven 300 to sense the temperature at different locations along the length of the oven 300. In some examples, the temperature within the oven 300 can be constant along the length of the oven 300. In other examples, the temperature may vary along the length of the oven 300 such that the food product 104 is heated to different temperatures as it moves through the oven 300. The PLC 114 may also track time data with respect to the heat treatment, such as a start time of the treatment with respect to a quantity of the food product 104, an end time of the treatment with respect to a quantity of the food product 104, a duration of the treatment and/or stages of the treatment with respect to a quantity of the food product 104, etc. This data 302 (e.g., temperature data, time data, speed data, etc.) can be collected by the gateway device 110 as the data 302 is generated. In some examples, the speed of the transport mechanism (e.g., the conveyor) or the residence time (or dwell time) of the food product 104 within a device(s) involved in treating the food product 104 can be collected by the gateway device 110. The speed of the transport mechanism impacts the duration that the food product 104 spends inside of the device(s) treating it, also known as the residence time or the dwell time. The gateway device 110 may reshape the data 302 into data 118, and the gateway device 110 may send the reshaped data 118 to the computing system 102, which may be located remotely from the facility 106 where the food product 104 is being treated.

In the example of FIG. 3, the food product 104 may enter the oven 300 at a starting temperature, and the food product 104 may be heated while moving through the oven 300. This may involve increasing the temperature of the food product 104 from the starting temperature to a first temperature as the food product 104 moves through a first section of the oven 300, changing (e.g., increasing or decreasing) the temperature of the food product 104 from the first temperature to a second temperature as the food product 104 moves through a second section of the oven 300, and so on and so forth. It is to be appreciated that the data 302 collected during the heat treatment of the food product 104 may be any suitable type of data associated with the heat treatment, such as temperature data, time data, etc., which may be associated with a quantity of the food product 104 that is located at a particular position with respect to the oven 300 (e.g., at the entrance of the oven 300, at a particular position within the oven 300, at the exit of the oven 300, etc.). In other examples, the data 302 may include other types of data, such as chemical concentration data indicative of the concentration of the chemical introduced to the food product 104 during the continuous process, pH data indicative of the pH of the food product 104 during the continuous process, and the like.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
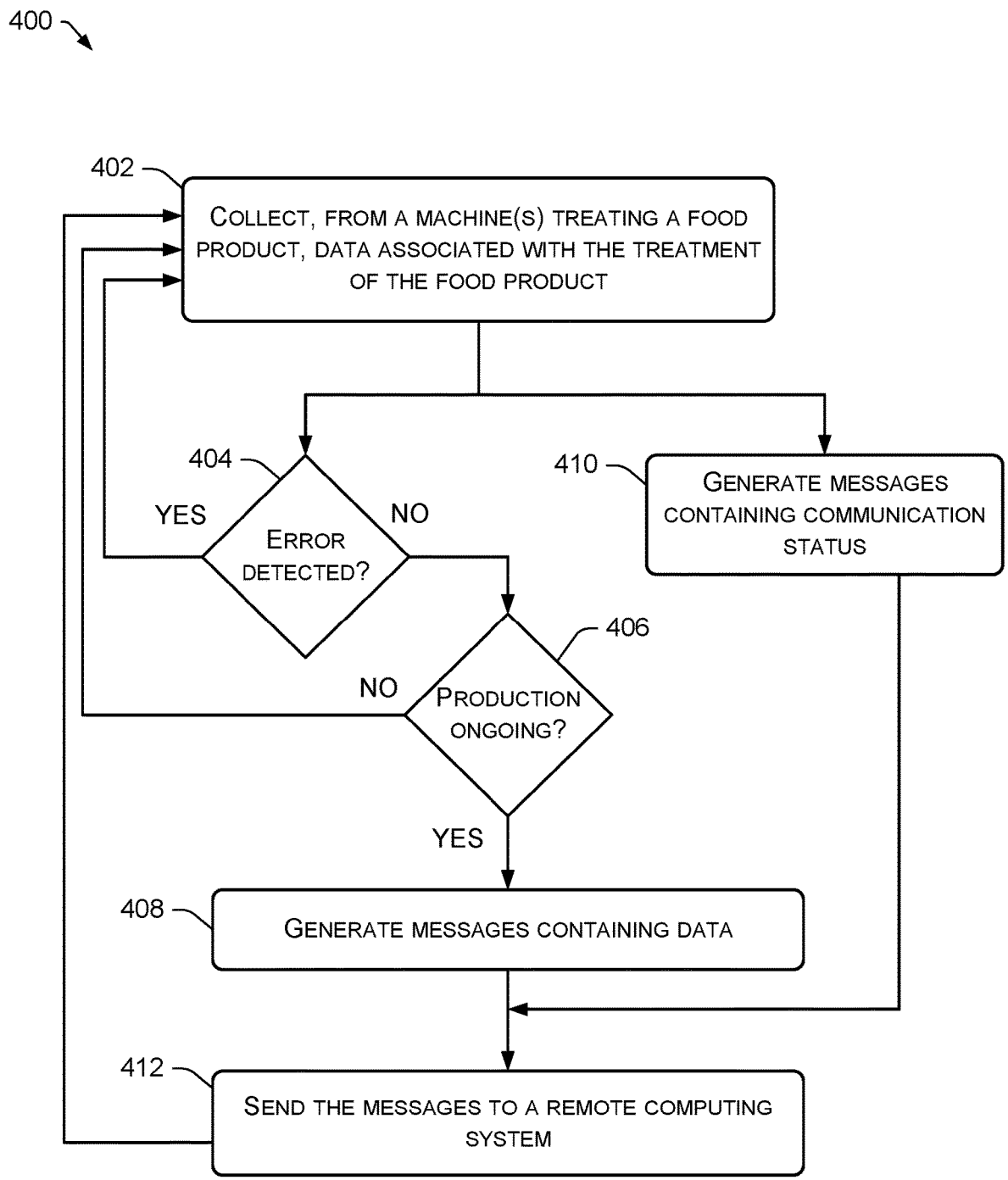
FIG. 4 is a flow diagram of an example process for collecting data associated with treatment of a food product.

FIG. 4 is a flow diagram of an example process 400 for collecting data 202, 302 associated with treatment of a food product 104. The process 400 is described, by way of example, with reference to the previous figures. In some examples, the process 400 may be implemented by the gateway device 110 described herein.

At 402, the gateway device 110 may collect, from a device(s) involved in treating a food product 104 within a facility 106, data 202, 302 associated with the treatment of the food product 104. The device(s) from which the data 202, 302 is collected may be a PLC(s) 114, a sensor(s) 116, and/or a combination thereof, which may be associated with equipment (e.g., a tank, an oven, a chamber, a vessel, etc.) within the facility 106 used to treat the food product 104. The data 202, 302 collected at block 402 may include any suitable type of data, such as temperature data, pressure data, time data, chemical concentration data, pH data, product name, treatment program name, sequence number, or the like. At least some of the data 202, 302 collected at block 402 may represent data that can be provided as input to a model 126 (e.g., a mathematical model, a machine learning model, etc.) used for determining a log reduction value associated with the food product 104 with respect to a target pathogen.

At 404, the gateway device 110 may determine whether an error is detected in association with the collected data 202, 302. If an error is detected at block 404, the process 400 may follow the YES route from block 404 to block 402 where additional data 202, 302 is collected. In some examples, the gateway device 110 waits for a timeout to occur before collecting additional data 202, 302 at block 402. If an error is not detected at block 404, the process 400 may follow the NO route from block 404 to block 406.

At 406, the gateway device 110 may determine whether production (e.g., a production sequence) is ongoing. Production may be ongoing if the food product 104 is being treated, as described herein. If production is not ongoing at block 406, the process 400 may follow the NO route from block 406 to block 402 where additional data 202, 302 is collected. That is, the data collection (e.g., reading) performed by the gateway device 110 at block 402 may be continuous, even when production is not ongoing, and the sending of the collected data 202, 302 may be triggered if it is determined that production is ongoing at block 406. If production is ongoing at block 406, the process 400 may follow the YES route from block 406 to block 408.

At 408, the gateway device 110 may generate messages containing the data collected at block 402. In some examples, the gateway device 110 may reshape the collected data 202, 302, such as by normalizing the data 202, 302, into data 118, and the reshaped (e.g., normalized) data 118 is included in the messages generated at block 408. The normalization of the data may help to create data 118 in a common format that the process control module(s) 124 is configured to process.

At 410, the gateway device 110 may also generate messages containing communication status, regardless of whether production is ongoing or not. Block 410 may be performed for process communication monitoring to guarantee that communication between the device(s) involved in treating the food product 104 (e.g., PLC(s), sensor(s), etc.) and the gateway device 110, and between the gateway device 110 and the computing system 102 is correct (e.g., values are included in the data and are valid).

At 412, the gateway device 110 may send messages to a computing system 102 over a network(s) 112. If production is not ongoing, the messages sent at block 412 may be the communication status messages, which, in the absence of messages containing the data (e.g., the data 118), may serve as a heartbeat for the computing system 102 to confirm production can be monitored at any time. If production is ongoing, the messages sent at block 412 may be the communication status messages and messages containing the data (e.g., the data 118). The computing system 102 may be located remotely from the gateway device 110. For example, the gateway device 110 may be located in the facility 106 where the food product 104 is being processed, and the computing system 102 may be a cloud-based computing system 102. Following block 412, the process 400 may iterate, as shown by the return arrow from block 412 to block 402.

Figure 5:
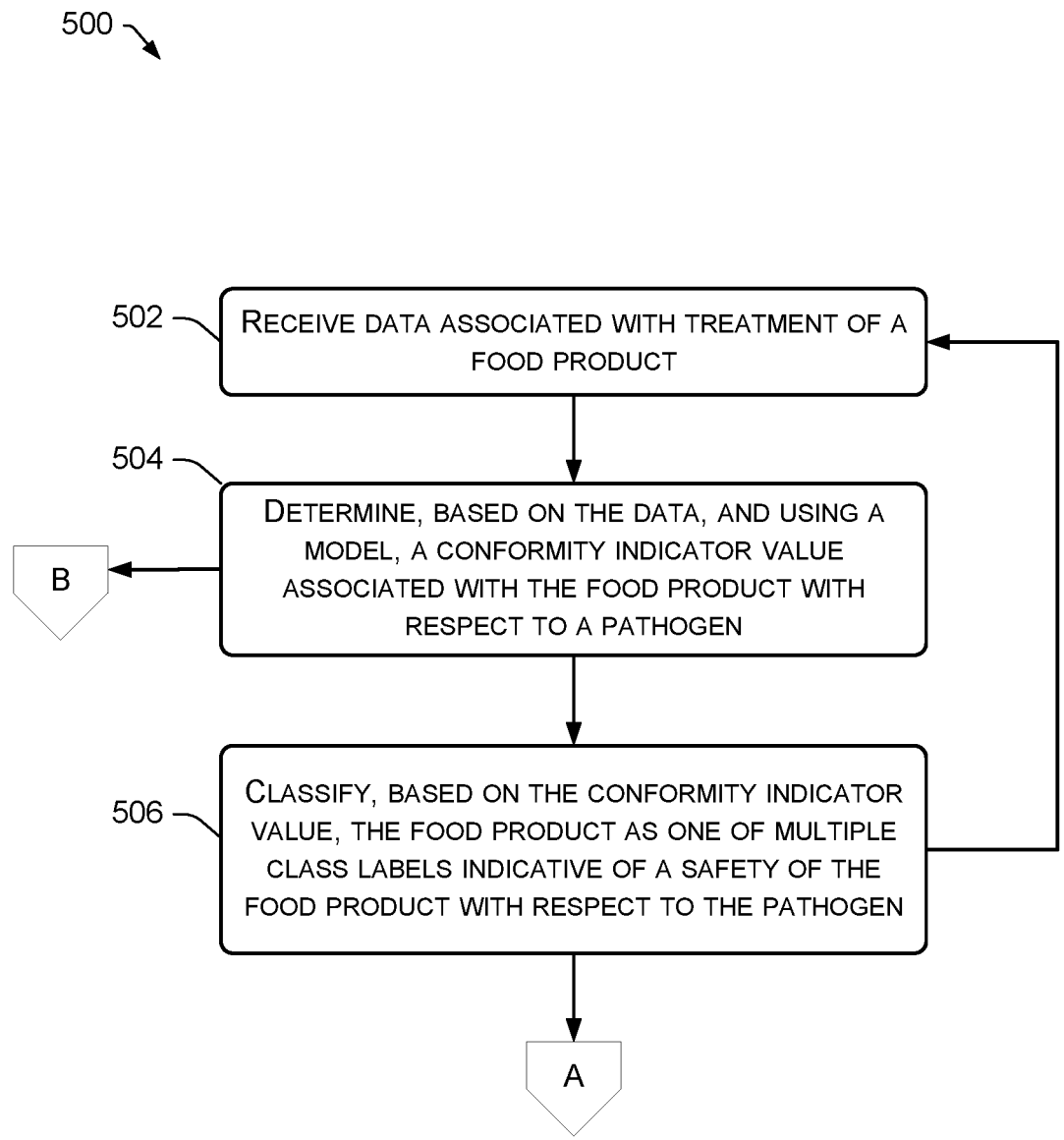
FIG. 5 is a flow diagram of an example process for determining a safety of the food product with respect to a pathogen based on data associated with the treatment of the food product.

FIG. 5 is a flow diagram of an example process 500 for determining a safety of a food product 104 with respect to a pathogen based on data 118 associated with the treatment of the food product 104. The process 500 is described, by way of example, with reference to the previous figures. In some examples, the process 500 may be implemented by the computing system 102 described herein.

At 502, a computing system 102 may receive data 118 associated with treatment of a food product 104. The data 118 may be received from a gateway device 110 located in or near a facility 106 where the food product 104 is being processed, as described herein. The data 118 may be received during and/or throughout the treatment of the food product 104. In some examples, the treatment includes a heat treatment to reduce an amount of a target pathogen in the food product 104, as described herein. In other examples, the treatment may include another type of treatment, such as a chemical treatment, to reduce an amount of a target pathogen in the food product 104, as described herein.

At 504, the computing system 102 (e.g., using the process control module(s) 124) may determine, based at least in part on the data 118 received at block 502, and using a model 126, a conformity indicator value associated with the food product 104 with respect to the target pathogen. For example, the process control module(s) 124 may provide the data 118 as input to the model 126 to determine the conformity indicator value. In some examples, the model 126 used at block 504 is a mathematical model, as described herein. In other examples, the model 126 used at block 504 is a trained machine learning model, as described herein. The conformity indicator value determined at block 504 may be any suitable indication of the safety of the food product 104 with respect to the pathogen. In some examples, the conformity indicator value is a class label (e.g., safe or unsafe), as described herein. In some examples, a confidence level indicator may be determined at block 504, such as a value within a range of 0 to 100% indicative of a confidence level of the determination at block 504. In some examples, the conformity indicator value and/or the confidence level indicator may be the log reduction value, as described herein. The log reduction value determined (e.g., estimated, calculated, etc.) at block 504 may be a measure of a reduction of an amount (e.g., a concentration) of a pathogen in the food product 104. The log reduction value may be the common logarithm of the ratio of the levels of pathogen in the food product 104 before starting the treatment of the food product 104 and after starting the treatment of the food product 104 at a time when the log reduction value is determined. An n-log reduction can mean that the concentration of remaining pathogen in the food product 104 is $10^{-n}$ times that of the original concentration before starting the treatment of the food product 104. For example, a 0-Log reduction corresponds to no reduction of the pathogen, a 1-Log reduction may correspond to a reduction of 90% relative to the original concentration of the pathogen, a 2-Log reduction may correspond to a reduction of 99% relative to the original concentration of the pathogen, a 3-Log reduction may correspond to a reduction of 99.9% relative to the original concentration of the pathogen, a 4-Log reduction may correspond to a reduction of 99.99% relative to the original concentration of the pathogen, a 5-Log reduction may correspond to a reduction of 99.999%, and so on and so forth.

At 506, the computing system 102 (e.g., the process control module(s) 124) may classify, based at least in part on the conformity indicator value determined at block 504, the food product 104 as a class label indicative of a safety of the food product 104 with respect to the pathogen. For example, the class label may be a binary classification of "safe" or "unsafe," "conforming" or "non-conforming", "compliant" or "non-compliant", "lethal" or "non-lethal", etc. In some examples, the conformity indicator value or the confidence level indicator determined at block 504 is compared to a threshold in order to classify the food product 104 at block 506 (e.g., if the log reduction value determined at block 504 is 6-Log, and the threshold is 5-Log, this may result in classifying the food product 104 as "safe," "conforming," "compliant," or "non-lethal" at block 506. As shown by the return arrow from block 506 to block 502, the process 500 may iterate as long as data is received at block 502. In other words, the process 500 can iterate at any suitable frequency or interval (e.g., every 10 seconds, every 30 seconds, etc.) and/or in response to events, as described herein, and multiple log reduction values can be determined over the multiple iterations. It is also to be appreciated that, in some examples, a food product 104 may be classified at block 506 without determining a log reduction value, such as by using a trained machine learning model to classify the food product 104 "safe" or "unsafe" based on the data 118 received at block 502. This machine learning model may be trained on data that includes features including log reduction values, but the machine learning model does not have to output a log reduction value, as it can output a food safety classification in other ways besides a log reduction value.

Figure 6A:
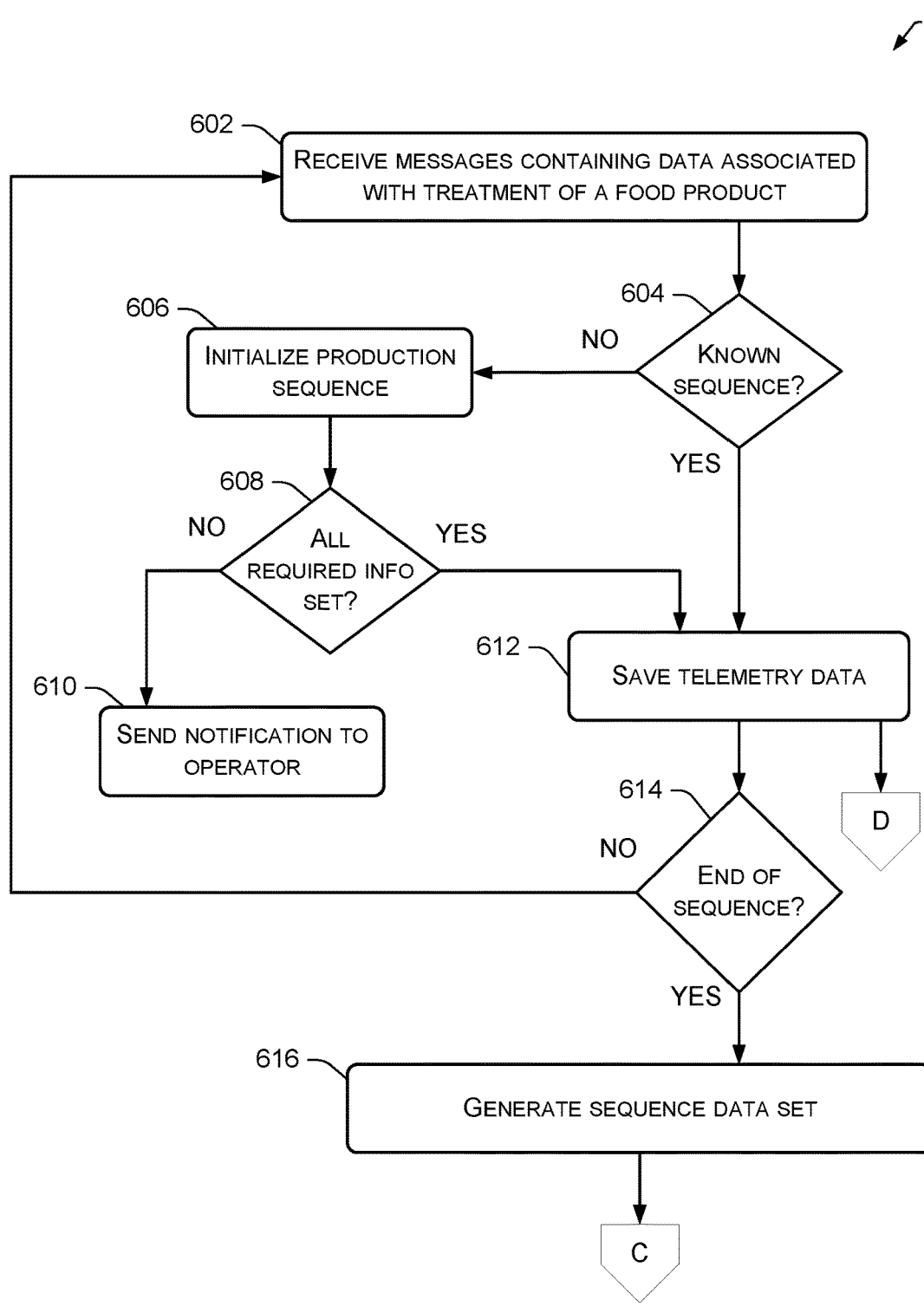
FIGS. 6A-6C illustrate a flow diagram of an example process for classifying the food product as safe or unsafe with respect to a pathogen based on data associated with the treatment of the food product.
Figure 6B:
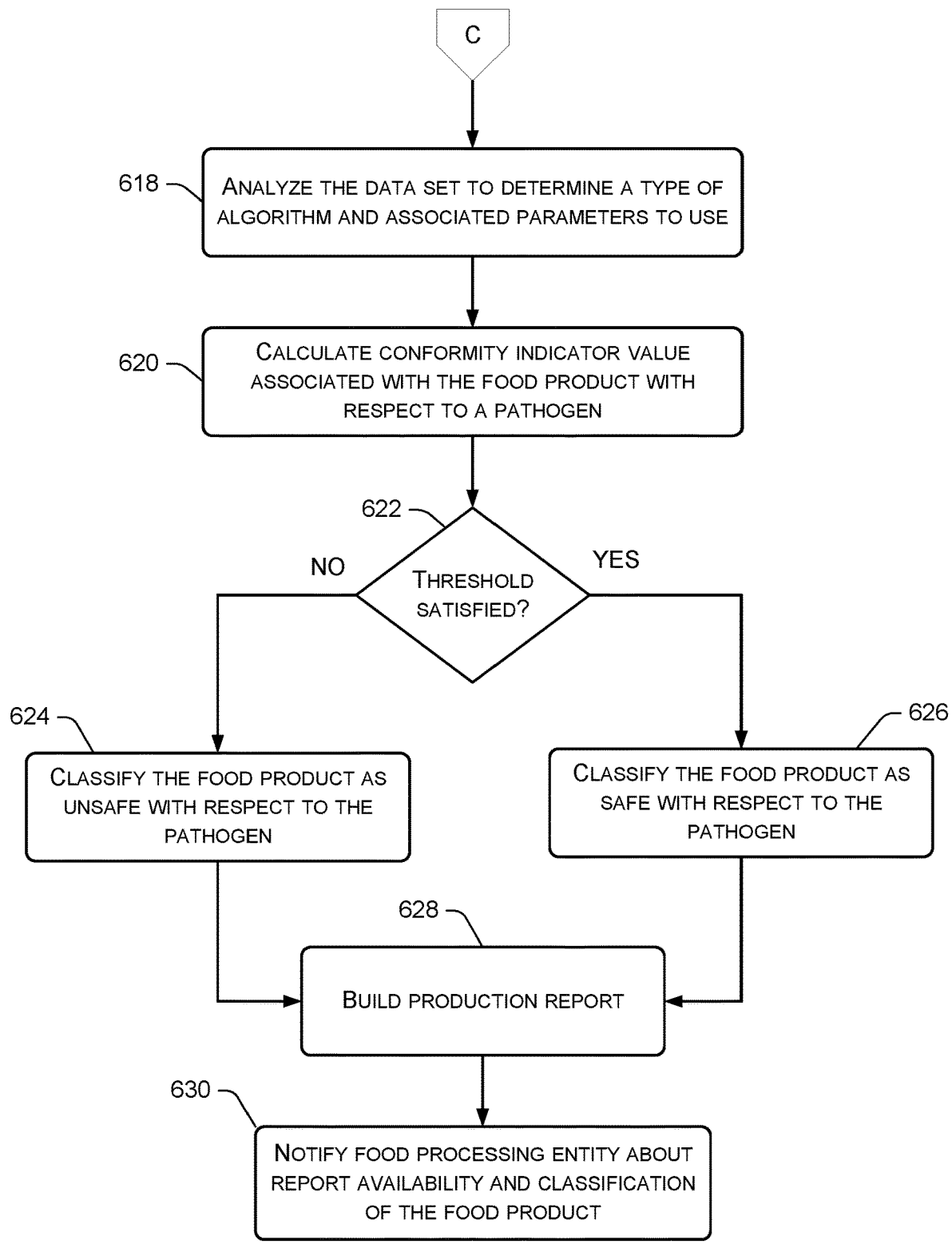
Figure 6C:
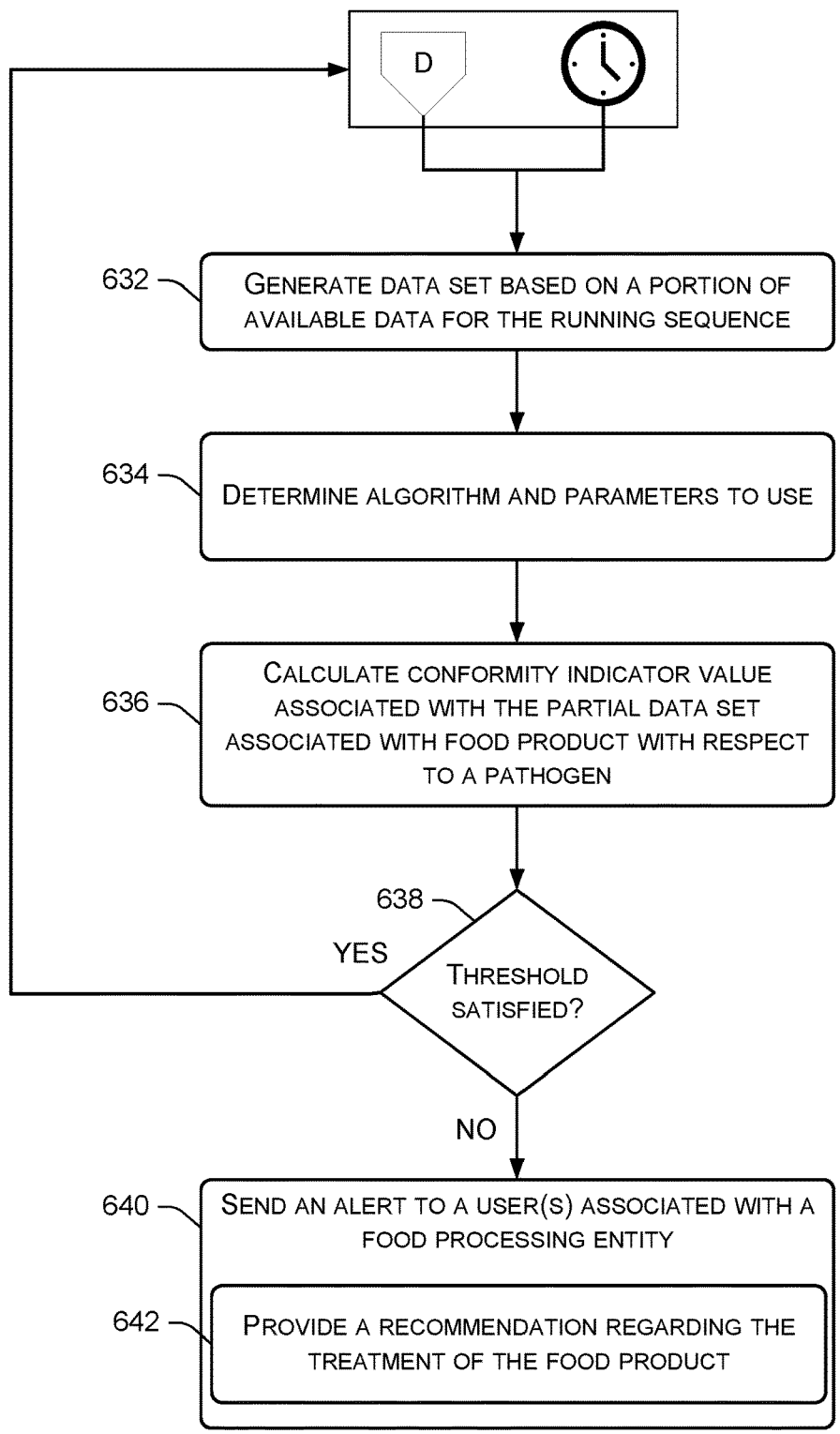

FIGS. 6A-6C illustrate a flow diagram of an example process 600 for classifying a food product 104 as safe or unsafe with respect to a pathogen based on data 118 associated with the treatment of the food product 104. The process 600 is described, by way of example, with reference to the previous figures. In some examples, the process 600 may be implemented by the computing system 102 described herein.

At 602, a computing system 102 may receive messages containing data 118 associated with treatment of a food product 104. The messages may be received in a series of messages starting with a "start" message, and followed by one or more subsequent messages in a series of messages. The start message (or first message in the series) may define one end of a bounded sequence that corresponds to the treatment of the food product 104, or a stage of the treatment. The messages may be received from a gateway device 110 located in or near a facility 106 where the food product 104 is being processed, as described herein. The messages may be received during and/or throughout the treatment of the food product 104. In some examples, the treatment includes a heat treatment to reduce an amount of a target pathogen in the food product 104, as described herein. In other examples, the treatment may include another type of treatment, such as a chemical treatment, to reduce an amount of a target pathogen in the food product 104, as described herein.

At 604, the computing system 102 (e.g., the process control module(s) 124) may determine if the received messages are associated with a known sequence. If the received messages are not associated with a known sequence at block 604, the process 600 may follow the NO route from block 604 to block 606.

At 606, the computing system 102 (e.g., the process control module(s) 124) may initialize a production sequence.

At 608, the computing system 102 (e.g., the process control module(s) 124) may determine whether the required information is set. If the required information is not set at block 608, the process 600 may follow the NO route from block 608 to block 610 where a notification can be sent to an operator of the food treatment process. If the required information is set at block 608, or, alternatively, if the received messages are associated with a known sequence at block 604, the process 600 may follow the YES route from either block 604 or block 608 to block 612 where the data contained within the messages (e.g., telemetry data) may be saved.

At 614, the computing system 102 (e.g., the process control module(s) 124) may determine if an end of a sequence has been reached. This may be detected by receiving an "end" message in the series of messages. The sequence from the "start" message to the "end" message may be defined by the food processing entity that is operating the facility 106 where the food product 104 is being processed. Additionally, or alternatively, the end of the sequence may be detected by determining that a predetermined amount of time has lapsed since receipt of the "start" message (or first message in the series). For example, the end of the sequence may be detected after 10 seconds since the receipt of the "start" message, or any other suitable time interval. If the end of the sequence is not detected at block 614, the process 600 may follow the NO route from block 614 to block 602 to continue receiving the messages until the end of the sequence is detected. Once the end of the sequence is detected at block 614, the process 600 may follow the YES route from block 614 to block 616.

At 616, the computing system 102 (e.g., the process control module(s) 124) may generate a data set for the sequence based on the messages received during the sequence. In some examples, this involves concatenating the data 118 contained in the set of messages into a data set. The data set may include the relevant data for the sequence, which may correspond to a stage or a portion of the treatment of the food product 104, or to the entire treatment of the food product 104.

Turning to FIG. 6B, and following block 616, the process 600 may continue at block 618, as denoted by the off-page reference "C" in FIGS. 6A and 6B. At 618, the computing system 102 (e.g., the process control module(s) 124) may analyze the data set to determine a type of algorithm and associated parameters to utilize. For example, there may be multiple different available algorithms that can be used with the data set to determine a log reduction value associated with the food product 104 with respect to the pathogen, and the result of the analysis performed at block 618 may be a selection of one of the multiple algorithms. Additionally, or alternatively, there may be multiple model parameters (e.g., multiple sets of model parameters including, for example, a D-value and a z-value, as defined in the above Equations (1)-(3)), and the result of the analysis performed at block 618 may be a selection of one of the multiple sets of model parameters. This selection of an algorithm and model parameters may be based on an identification, from the data set, of a type of food product 104 (e.g., the form of the food product 104, the origin of the food product 104, etc.) being processed, a program used for the treatment of the food product 104, and/or an identifier of the equipment being used to treat the food product 104. That is, the equipment in the facility 106, such as the PLCs 114, and/or the gateway device 110, may report an identifier of the food product 104, an identifier of a program used to treat the food product 104, and/or an identifier of the equipment being used to treat the food product 104, and these identifiers may dictate which algorithm and/or model parameters to use for determining the log reduction value. In some examples, the process control module(s) 124 may include sub-modules, and the result of the analysis performed at block 618 may be a selection of one of these sub-modules. Each sub-module of the process control module(s) 124 may implement a different algorithm and/or different model parameters to determine a log reduction value associated with the food product 104.

At 620, the computing system 102 (e.g., the process control module(s) 124) may determine a conformity indicator value associated with the food product 104 with respect to the target pathogen using the algorithm and/or model parameters determined at block 618. For example, the process control module(s) 124 may provide data 118 from the data set as input to a model 126 and/or to a selected sub-module to determine the conformity indicator value using an appropriate algorithm and/or model parameters. The conformity indicator value determined at block 620 may be any suitable indication of the safety of the food product 104 with respect to the pathogen. In some examples, the conformity indicator value is a class label (e.g., safe or unsafe), as described herein. In some examples, a confidence level indicator may be determined at block 620, such as a value within a range of 0 to 100% indicative of a confidence level of the determination at block 620. In some examples, the conformity indicator value and/or the confidence level indicator may be the log reduction value, as described herein. In some examples, a mathematical model is used to determine the log reduction value at block 620, as described herein. In other examples, a trained machine learning model is used to determine the log reduction value at block 610, as described herein.

At 622, the computing system 102 (e.g., the process control module(s) 124) may determine whether the conformity indicator value or the confidence level indicator (e.g., log reduction value) calculated at block 620 satisfies a threshold (which may correspond to a "target" value (e.g., log reduction value) that the food processing entity is trying to achieve). For example, the threshold may be 5-Log, and a log reduction value calculated at block 620 may be compared to this threshold to determine if it satisfies the threshold (e.g., by meeting or exceeding the threshold, or by strictly exceeding the threshold). In some examples, when multiple log reduction values are calculated by iterating blocks 602 to 620 of the process 600, a statistic of the multiple log reduction values is calculated and compared to the threshold, such as an average of the log reduction values, a cumulative log reduction value (e.g., using Equation (3) above), or the like.

If the threshold is not satisfied at block 622, the process 600 may follow the NO route from block 622 to block 624 where the food product 104 may be classified as unsafe with respect to the target pathogen. For example, if a log reduction value (e.g., cumulative log reduction value) of 3-Log is calculated (e.g., at the conclusion of the treatment of the food product 104), and if the threshold is 5-Log, the food product 104 may be classified as unsafe at block 624. If the threshold is satisfied at block 622, the process 600 may follow the YES route from block 622 to block 626 where the food product 104 may be classified as safe with respect to the target pathogen.

At 628, the computing system 102 (e.g., the process control module(s) 124) may build or generate a report 132 (e.g., a production report) associated with the food product 104. The report 132 may include any suitable food safety information, such as the class label for the food product 104. For example, if the food product 104 was classified as "safe" at block 626, the report 132 may include an indication that the food product 104 is safe with respect to a pathogen of interest. In some examples, the report 132 may include a conformity indicator value(s). In some examples, the report 132 may indicate the conformity indicator value(s) achieved at various stages throughout the treatment (e.g., at various stages throughout a continuous process where the food product 104 is moved by a transport mechanism, such as a conveyor). In some examples, the report 132 may indicate a minimum log reduction value and/or a maximum log reduction value achieved during treatment of the food product 104. In some examples, the report 132 may include a target log reduction value so that a user 130 can easily compare the determined log reduction value(s) to the target log reduction value. In some examples, the report 132 may include information about the food product 104, such as an identifier of the food product (e.g., "Food Product: ABC"), a production identifier (e.g., "PID #: N"), and/or information about a pathogen of interest (e.g., "Pathogen: XYZ"). In some examples, the report 132 may include any of the raw data 118 received from the gateway device 110 during treatment of the food product 104 within the facility 106, such as temperature data sensed at various stages throughout a continuous process where the food product 104 is moved by a transport mechanism, such as a conveyor.

At 630, the computing system 102 may notify a user(s) 130 associated with a food processing entity about the availability of the report 132 and/or the classification of the food product 104. Notifying the user(s) 130 at block 630 may include sending the report 132 and/or a notification to the user(s) 130, such as sending an email to an email account(s) associated with the user(s) 130 (e.g., as an attachment, as a link to a web address, etc.), causing the report 132 to be displayed via a client application(s) installed on a user device(s) 134, causing the report 132 to be displayed via a web browser(s) executing on a user device(s) 134, or any other suitable manner of providing the notification (e.g., providing the report 132 to a user(s) 130 in any suitable digital format, as described herein). A user(s) 130 can submit the report 132 to a food safety regulator, such as the FDA in the United States, for compliance with food safety rules. The report 132 may be interactive or static, as described herein. A user(s) 130 can print the report 132 and/or save it on the user device(s) 134.

Turning to FIG. 6C, and following block 612, the process 600 may continue at block 632, as denoted by the off-page reference "D" in FIGS. 6A and 6C, or after a passage of time, as denoted by the clock icon in FIG. 6C. At 632, the computing system 102 (e.g., the process control module(s) 124) may generate a data set for a running sequence based on a portion of available data contained in the messages received at block 602. In some examples, this involves concatenating the data 118 contained in the set of messages into a data set. The data set may include the relevant data for the running sequence.

At 634, the computing system 102 (e.g., the process control module(s) 124) may analyze the data set to determine a type of algorithm and associated parameters to utilize. The operations performed at block 634 may be similar to those performed at block 618.

At 636, the computing system 102 (e.g., the process control module(s) 124) may determine a conformity indicator value associated with the partial data set associated with the food product 104 with respect to the target pathogen using the algorithm and/or model parameters determined at block 634. For example, the process control module(s) 124 may provide data 118 from the data set as input to a model 126 and/or to a selected sub-module to determine the conformity indicator value using an appropriate algorithm and/or model parameters. In some examples, a confidence level indicator may be determined at block 636. In some examples, a mathematical model is used to determine the log reduction value at block 636, as described herein. In other examples, a trained machine learning model is used to determine the log reduction value at block 636, as described herein.

At 638, the computing system 102 (e.g., the process control module(s) 124) may determine whether the conformity indicator value or the confidence level indicator (e.g., log reduction value) calculated at block 636 satisfies a threshold (which may correspond to a "target" value (e.g., log reduction value) that the food processing entity is trying to achieve). For example, the threshold may be 5-Log, and a log reduction value calculated at block 636 may be compared to this threshold to determine if it satisfies the threshold (e.g., by meeting or exceeding the threshold, or by strictly exceeding the threshold). In some examples, when multiple log reduction values are calculated by iterating blocks 602 to 636 of the process 600, a statistic of the multiple log reduction values is calculated and compared to the threshold, such as an average of the log reduction values, a cumulative log reduction value (e.g., using Equation (3) above), or the like.

If the threshold is not satisfied at block 638, the process 600 may follow the NO route from block 638 to block 640 where an alert is sent to the user(s) 130. Sending an alert to the user(s) 130 may include sending an email to an email account(s) associated with the user(s) 130, causing an alert to be displayed via a client application(s) installed on a user device(s) 134, causing an alert to be displayed via a web browser(s) executing on a user device(s) 134, sending a push notification, a text message, or the like to the user device(s) 134 associated with the user(s) 130, or any other suitable manner of providing an alert to a user(s) 130. In some examples, the alert may notify the user(s) 130 of a food product 104 that has been determined to be unsafe.

At sub-block 642, the alert may provide (or include) a recommendation regarding the treatment of the food product 104. For example, if the food product 104 is determined to be unsafe, the alert may recommend to continue treating the food product 104 after completing the treatment, or to treat the food product 104 again. Such an alert, if timely received by the user(s) 130, may allow for driving efficiencies of the food processing. That is, if the user(s) 130 can quickly modify the treatment parameters to extend the duration of heat treatment, or re-treat a batch of food product 104 without wasting time, energy, and/or other resources. If the threshold is satisfied at block 638, the process 600 may follow the YES route from block 638 to iterate blocks 632-638.

It is to be appreciated that any of the data received at block 502 of the process 500 and/or at block 602 of the process 600, and/or the conformity indicator values or confidence level indicators (e.g., log reduction values) determined at blocks 504, 620, and 636 of the respective processes 500 and 600, and/or the classifications determined at blocks 506 and 624, 626 of the respective processes 500 and 600 may be stored by the computing system 102 as food safety data 128, and this food safety data 128 can be made available to authorized users 130 associated with the food processing entity that is operating the facility 106 where the food product 104 is processed. This can allow for real-time (or "live") display (e.g., on the user devices 134) of parameters (e.g., log reduction values, raw data associated with the treatment of the food product 104, such as temperature data, pressure data, time data, chemical concentration data, pH data, etc.) and/or various dashboarding features to analyze the food safety data 128.

Figure 7:
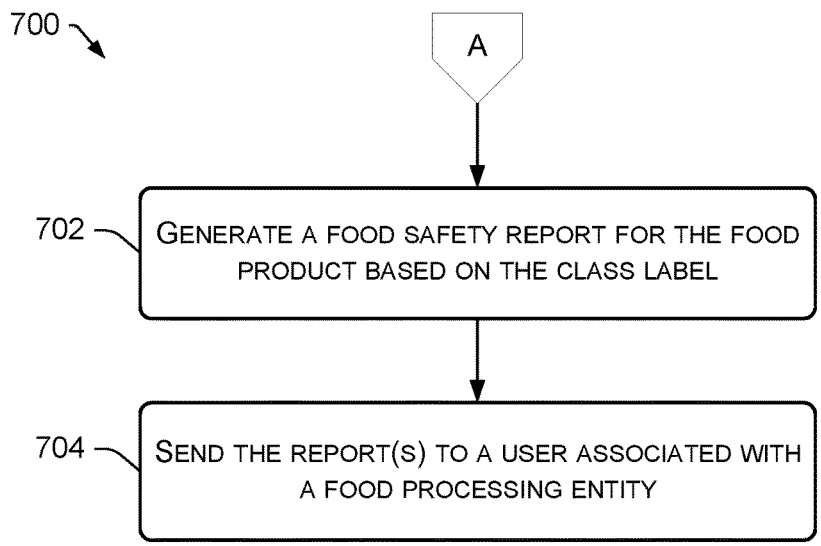
FIG. 7 is a flow diagram of an example process for generating a food safety report for a classified food product, and sending the report to a user associated with a food processing entity.

FIG. 7 is a flow diagram of an example process 700 for generating a food safety report 132 for a classified food product 104, and sending the report 132 to a user 130 associated with a food processing entity. The process 700 is described, by way of example, with reference to the previous figures. In some examples, the process 700 may be implemented by the computing system 102 described herein. Furthermore, the off-page reference "A" in FIGS. 5 and 7 indicate that the process 700 may continue from block 506 of the process 500, after a food product 104 has been classified as a class label indicative of a safety of the food product 104 with respect to a pathogen.

At 702, a computing system 102 (e.g., the process control module(s) 124) may generate a report 132 associated with the food product 104. The report 132 may include any suitable food safety information, such as the class label for the food product 104 determined by performing the process 500 or the process 600. For example, if the food product 104 was classified as "safe" at block 618 of the process 600, the report 132 may include an indication that the food product 104 is safe with respect to a pathogen of interest. In some examples, the report 132 may include a log reduction value(s) determined at block 504 of the process 500 or at block 610 of the process 600. In some examples, the report 132 may indicate the log reduction value(s) achieved at various stages throughout the treatment (e.g., at various stages throughout a continuous process where the food product 104 is moved by a transport mechanism, such as a conveyor). In some examples, the report 132 may indicate a minimum log reduction value and/or a maximum log reduction value achieved during treatment of the food product 104. In some examples, the report 132 may include a target log reduction value so that a user 130 can easily compare the determined log reduction value(s) to the target log reduction value. In some examples, the report 132 may include information about the food product 104, such as an identifier of the food product (e.g., "Food Product: ABC"), a production identifier (e.g., "PID #: N"), and/or information about a pathogen of interest (e.g., "Pathogen: XYZ"). In some examples, the report 132 may include any of the raw data 118 received from the gateway device 110 during treatment of the food product 104 within the facility 106, such as temperature data sensed at various stages throughout a continuous process where the food product 104 is moved by a transport mechanism, such as a conveyor.

At 704, the computing system 102 may send the report 132 or a notification (e.g., an email) indicating the availability of the report 132 to a user(s) 130 associated with a food processing entity. Sending the report 132 to the user(s) 130 may include sending the report 132 to an email account(s) associated with the user(s) 130 (e.g., as an attachment, as a link to a web address, etc.), causing the report 132 to be displayed via a client application(s) installed on a user device(s) 134, causing the report 132 to be displayed via a web browser(s) executing on a user device(s) 134, or any other suitable manner of providing the report 132 to a user(s) 130 in any suitable digital format, as described herein. A user(s) 130 can submit the report 132 to a food safety regulator, such as the FDA in the United States, for compliance with food safety rules. The report 132 may be interactive or static, as described herein. A user(s) 130 can print the report 132 and/or save it on the user device(s) 134. In some examples, the report 132 and/or the notification associated with the report 132 may include optimization suggestions for the food processing entity, and/or indicators of whether the food product 104 is safe but risky, safe with little-to-no risk, over treated, or the like. In some examples, one or multiple threshold values may be used to notify the user at block 704.

Figure 8:
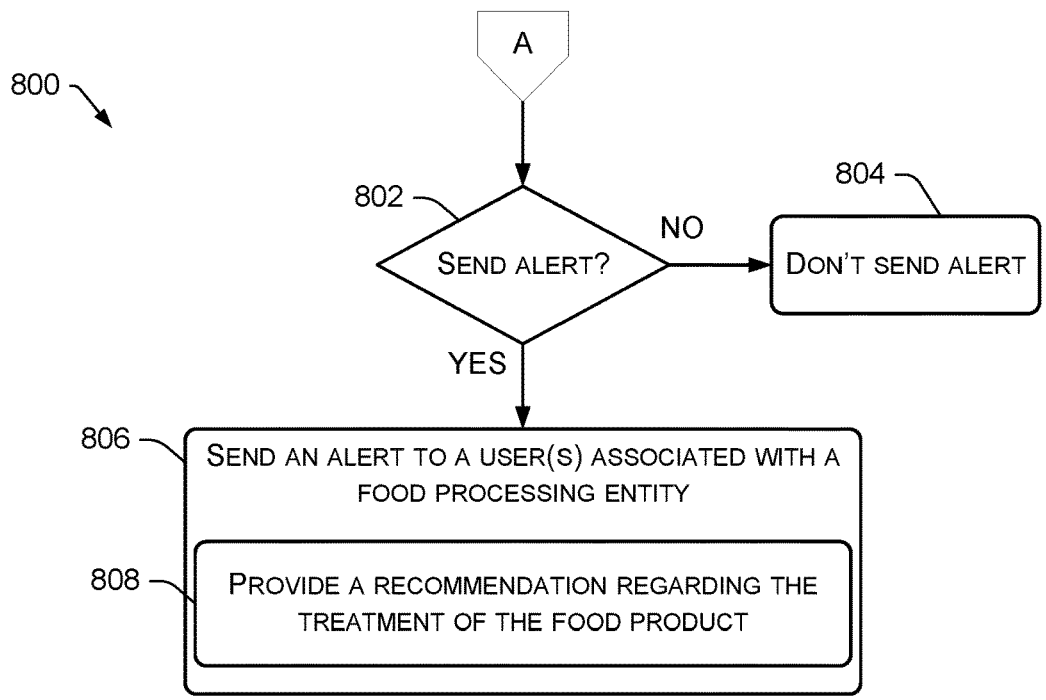
FIG. 8 is a flow diagram of an example process for determining whether to send an alert to a user associated with a food processing entity based on a safety classification of a food product.

FIG. 8 is a flow diagram of an example process 800 for determining whether to send an alert to a user 130 associated with a food processing entity based a safety classification of a food product 104. The process 800 is described, by way of example, with reference to the previous figures. In some examples, the process 800 may be implemented by the computing system 102 described herein. Furthermore, the off-page reference "A" in FIGS. 5 and 8 indicate that the process 800 may continue from block 506 of the process 500, after a food product 104 has been classified as a class label indicative of a safety of the food product 104 with respect to a pathogen.

At 802, a computing system 102 (e.g., the process control module(s) 124) may determine whether to send an alert to a user(s) 130 associated with a food processing entity based on a classification of a food product 104 determined by performing the process 500 or the process 600. For example, the computing system 102 may determine whether the food product 104 has been classified as "safe" or "unsafe" at block 802. In some examples, the computing system 102 may determine, at block 802, whether a user(s) 130 has configured settings to receive alerts from the computing system 102. In some examples, the computing system 102 may determine, at block 802, whether a determined (e.g., achieved) log reduction value exceeds a target log reduction value by at least a threshold amount. If it is determined, at block 802, to refrain from sending an alert to the user(s) 130, the process 800 may follow the NO route from block 802 to block 804 where an alert is not sent.

If it is determined, at block 802, to send an alert to the user(s) 130, the process 800 may follow the YES route from block 802 to block 806 where an alert is sent to the user(s) 130. Sending an alert to the user(s) 130 may include sending an email to an email account(s) associated with the user(s) 130, causing an alert to be displayed via a client application(s) installed on a user device(s) 134, causing an alert to be displayed via a web browser(s) executing on a user device(s) 134, sending a push notification, a text message, or the like to the user device(s) 134 associated with the user(s) 130, or any other suitable manner of providing an alert to a user(s) 130. In some examples, the alert may notify the user(s) 130 of a food product 104 that has been classified as safe by the process control module(s) 124. This may be the case where the user(s) 130 configured settings to receive alerts when quantities (e.g., batches) of food product 104 achieve a target log reduction value during treatment, for example. In other examples, the alert may be sent based a classification of the food product 104 as unsafe.

At sub-block 808, the alert may provide (or include) a recommendation regarding the treatment of the food product 104. For example, if the food product 104 is classified as safe, and if the log reduction value determined for the food product 104 exceeds a target log reduction value by at least a threshold amount, the alert may recommend a modification to the treatment of the food product 104, such as heating the food product 104 for a shorter duration, and/or heating the food product to a lower temperature. This type of optimization, when implemented by the food processing entity, can increase yield of the food product 104 and/or conserve energy to reduce the environmental impact of the facility 106. In some examples, if the food product 104 is classified as unsafe, the alert may recommend to continue treating the food product 104 after completing the treatment, or to treat the food product 104 again. Such an alert, if timely received by the user(s) 130, may allow for driving efficiencies of the food processing. That is, if the user(s) 130 can quickly modify the treatment parameters to extend the duration of heat treatment, or re-treat a batch of food product 104 without wasting time, energy, and/or other resources.

Figure 9:
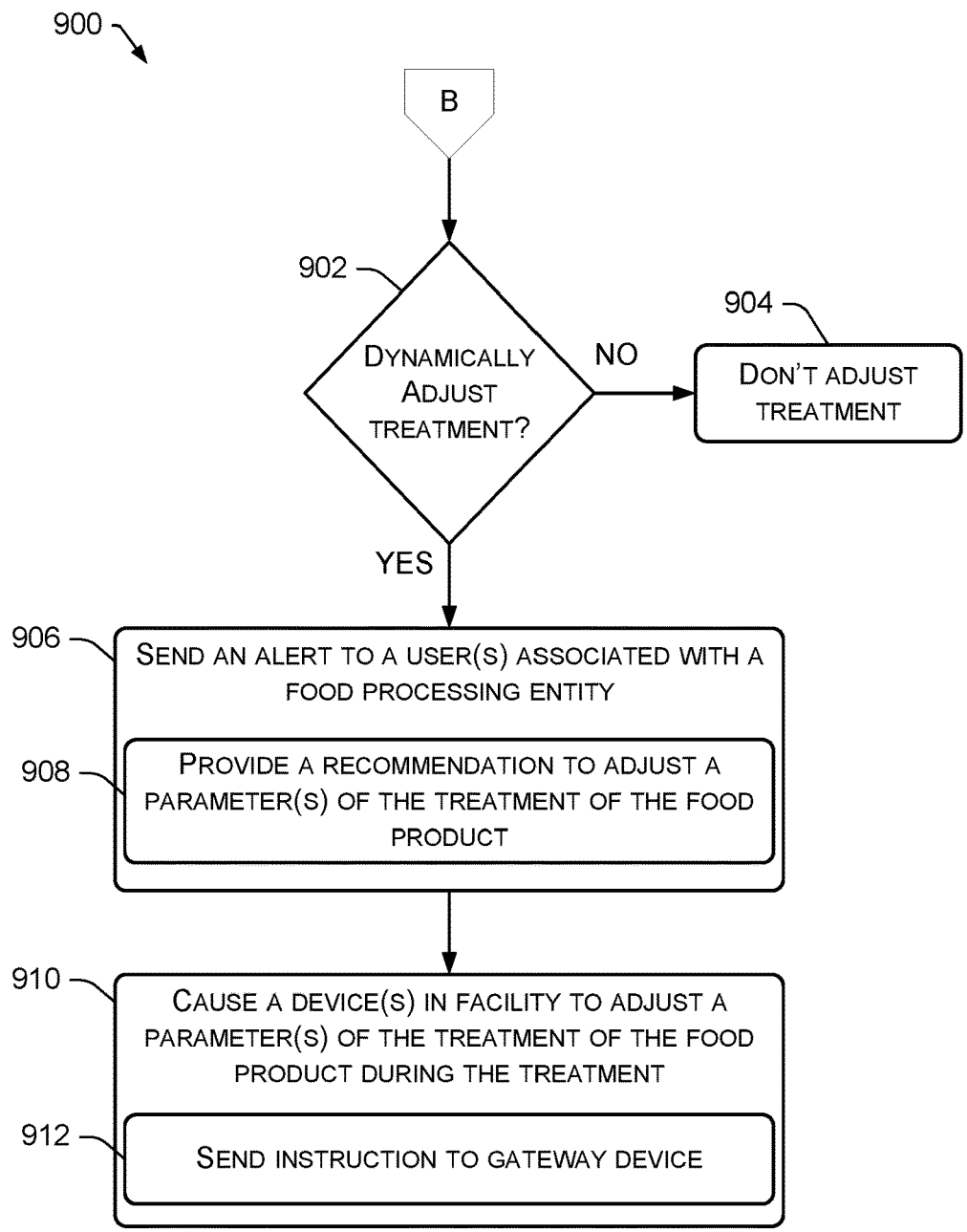
FIG. 9 is a flow diagram of an example process for determining whether to dynamically adjust ongoing treatment of a food product based on a log reduction value(s) determined during the treatment of the food product.

FIG. 9 is a flow diagram of an example process 900 for determining whether to dynamically adjust ongoing treatment of a food product 104 based on a log reduction value(s) determined during the treatment of the food product 104. The process 900 is described, by way of example, with reference to the previous figures. In some examples, the process 900 may be implemented by the computing system 102 described herein. Furthermore, the off-page reference "B" in FIGS. 5 and 9 indicate that the process 900 may continue from block 504 of the process 500, after a log reduction value associated with a food product 104 has been determined.

At 902, a computing system 102 (e.g., the process control module(s) 124) may determine whether to dynamically adjust ongoing treatment of a food product 104 while the food product 104 is being treated to reduce an amount of a pathogen in the food product 104. This determination at block 902 may be based at least in part on a determined log reduction value associated with the food product 104. For example, the determination at block 902 may include determining that a determined log reduction value satisfies a threshold (e.g., that a treatment has achieved a target log reduction value). To illustrate, if a target log reduction value is 5-Log, and, during treatment, the process control module(s) 124 determines a log reduction value of 5-Log has already been achieved before the treatment has completed (e.g., 10 minutes into a 25 minute heat treatment), the determination at block 902 may be in the affirmative. In another example, the determination at block 902 may include determining that a lower-than-expected log reduction value has been achieved at a particular stage of the treatment. For example, if the treatment is expected to result in the achievement of particular log reduction values as each stage of treatment is completed and/or at different times during the treatment, and if the log reduction values determined by the process control module(s) 124 are lower than expected, the determination at block 902 may be in the affirmative. In some examples, the determination at block 902 may be based on a classification indicative of a safety of the food product 104, such as a safe or unsafe classification. If it is determined, at block 902, to refrain from adjusting the treatment of the food product 104 (e.g., if a target log reduction value has not been achieved yet), the process 900 may follow the NO route from block 902 to block 904 where the treatment is not adjusted.

If it is determined, at block 902, to dynamically adjust the ongoing treatment of the food product 104, the process 900 may follow the YES route from block 902 to block 906. At 906, an alert may be sent to a user(s) 130 associated with a food processing entity. The alert may be similar to the types of alerts described with reference to block 806 of the process 800.

At sub-block 908, the alert may provide (or include) a recommendation to adjust a parameter(s) of the treatment of the food product 104. For example, if the log reduction values determined by the process control module(s) 124 are trending low (e.g., lower than expected) for the particular stage of the treatment, the recommendation provided at sub-block 908 may be to increase the temperature of heat treatment, and/or to increase a duration of the heat treatment. In another example, if a determined log reduction value satisfies a threshold (e.g., if the treatment has achieved a target log reduction value), the recommendation provided at sub-block 908 may be to stop the treatment before completing the treatment. This alert/recommendation approach leaves the decision to adjust the treatment in the hands of a user(s) 130 who may be in control of overseeing the treatment of the food product 104 within the facility 106. For example, a user(s) 130 can choose to override and/or ignore the alert/recommendation. Alternatively, the user(s) 130 can choose to implement the recommended adjustment to the parameter(s) of the treatment, which may result in a real-time optimization of the treatment to ensure the safety of a quantity (e.g., a batch) of the food product 104, increase yield of the food product 104, and/or conserve energy to reduce the environmental impact of the facility 106.

At 910, in addition to sending an alert, or alternatively, the computing system 102 (e.g., the process control module(s) 124) may cause a device(s) that is involved in the treatment of the food product 104 within the facility 106 to adjust a parameter(s) of the treatment. At sub-block 912, causing the device(s) to adjust the parameter(s) of the treatment may include sending an instruction to the gateway device 110 over the network(s) 112. This instruction, when received by the gateway device 110, may cause the gateway device 110 to control another device(s) within the facility 106, such as a PLC(s) 114 to adjust a parameter(s) (e.g., temperature, time, etc.) of the treatment of the food product 104. For example, if the log reduction values determined by the process control module(s) 124 are trending low (e.g., lower than expected) for the particular stage of the treatment, the instruction sent to the gateway device 110 may cause a PLC(s) 114 to increase the temperature of heat treatment, and/or to increase a duration of the heat treatment, and to do so automatically, without user intervention. In another example, if a determined log reduction value satisfies a threshold (e.g., if the treatment has achieved a target log reduction value), the instruction sent to the gateway device 110 may cause a PLC(s) 114 to stop the treatment before completing the treatment. This automated approach can allow for reducing or eliminating manual steps to adjust treatment dynamically, and it may provide for even greater optimization by adjusting the treatment more quickly than can be achieved by human operators. It is to be appreciated that an alert(s) can still be sent to a user(s) 130 at block 906 to inform the user(s) 130 that the treatment is being automatically adjusted. In some examples, if the adjustment to the treatment is to stop the treatment early, this may cause the gateway device 110 to receive an instruction at block 408 of the process 400, which may cause the gateway device 110 to stop sending messages (e.g., messages containing the data 118) to the computing system 102 at block 410 of the process 400.

The process 900 can allow for optimizing the processing of a food product 104 within a facility 106 in a variety of ways, such as by treating the food product 104 at a lower temperature, using less chemical to treat the product, increasing throughput (e.g., treating the food product 104 for a shorter duration). Furthermore, through the alert sent at block 906 and/or other dashboarding features provided by the food safety platform, a user(s) 130 associated with a food processing entity is able to see, in real-time, the calculated log reduction associated with the food product 104 with respect to a target pathogen. Accordingly, the food processing entity can optimize food processing within the facility 106 in real-time, or as a post-processing measure to improve the way that food is processed within the facility 106.

Figure 10:
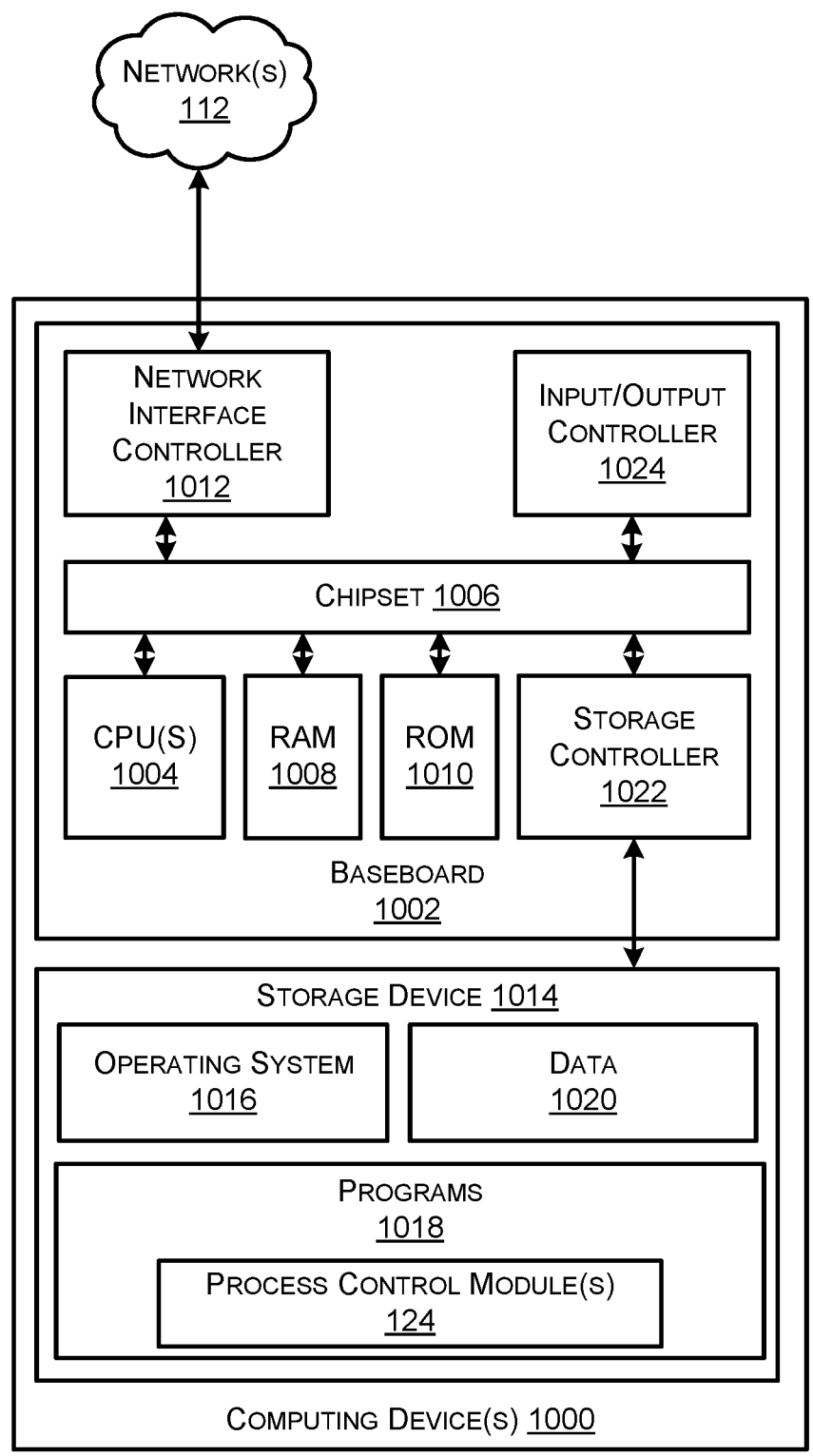
FIG. 10 is a computer architecture diagram showing an illustrative computer architecture for implementing a computing device(s) that can be utilized to implement aspects of the various technologies presented herein.

FIG. 10 shows an example computer architecture for a computing device(s) 1000 capable of executing program components for implementing the functionality described above. The computer architecture shown in FIG. 10 may represent a workstation, desktop computer, laptop, tablet, network appliance, smartphone, server computer, or other computing device, and can be utilized to execute any of the software components presented herein. For example, the computing device(s) 1000 may represent a server(s) of the computing system 102. As another example, the computing device(s) 1000 may represent the gateway device 110.

The computer 1000 includes a baseboard 1002, which is a printed circuit board (PCB) to which a multitude of components or devices can be connected by way of a system bus or other electrical communication paths. In one illustrative configuration, one or more CPUs 1004 operate in conjunction with a chipset 1006. The CPUs 1004 can be standard programmable processors that perform arithmetic and logical operations necessary for the operation of the computer 1000, and the CPUs 1004 may be the same as, or similar to, the processor(s) 120 of FIG. 1.

The CPUs 1004 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 may represent the "hardware bus" described above, and it can provide an interface to a RAM 1008, used as the main memory in the computing device(s) 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computing device(s) 1000 in accordance with the configurations described herein.

The computing device(s) 1000 can operate in a networked environment using logical connections to remote computing devices and computer systems through a network, such as the network 112 of FIG. 1. The chipset 1006 can include functionality for providing network connectivity through a network interface controller (NIC) 1012, such as a gigabit Ethernet adapter. The NIC 1012 may be capable of connecting the computing device(s) 1000 to other computing devices over the network 712. It should be appreciated that multiple NICs 1012 can be present in the computing device(s) 1000, connecting the computer to other types of networks and remote computer systems.

The computing device(s) 1000 can be connected to a mass storage device 1014 that provides non-volatile storage for the computer. The mass storage device 1016 can store an operating system 1016, programs 1018, and data 1020, to carry out the techniques and operations described in greater detail herein. For example, the programs 1018 may include the process control module(s) 124 described herein, and the data 1020 may include the model(s) 126, the food safety data 128, and/or the reports 132 described elsewhere herein. The mass storage device 1014 can be connected to the computing device 1000 through a storage controller 1022 connected to the chipset 1006. The mass storage device 1014 can consist of one or more physical storage units. The storage controller 1022 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device(s) 1000 can store data on the mass storage device 1014 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1014 is characterized as primary or secondary storage, and the like.

For example, the computing device(s) 1000 can store information to the mass storage device 1014 by issuing instructions through the storage controller 1022 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device(s) 1000 can further read information from the mass storage device 1014 by detecting the physical states or characteristics of one or more particular locations within the physical storage units.

In addition to the mass storage device 1014 described above, the computing device(s) 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device(s) 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

In one configuration, the mass storage device 1014 or other computer-readable storage media is encoded with computer-executable instructions which, when loaded into the computing device(s) 1000, transform the computer from a general-purpose computing system into a special-purpose computer capable of implementing the configurations described herein. These computer-executable instructions transform the computing device(s) 1000 by specifying how the CPUs 1004 transition between states, as described above. According to one configuration, the computing device(s) 1000 has access to computer-readable storage media storing computer-executable instructions which, when executed by the computing device(s) 1000, perform the various processes described above. The computing device(s) 1000 can also include computer-readable storage media storing executable instructions for performing any of the other computer-implemented operations described herein. Any of the computer-readable storage media depicted in FIG. 10 may be the same as, or similar to, the memory 122 of FIG. 1.

The computing device(s) 1000 can also include one or more input/output controllers 1024 for receiving and processing input from a number of input devices, such as a keyboard, a mouse, a touchpad, a touch screen, an electronic stylus, or other type of input device. Similarly, an input/output controller 1024 can provide output to a display, such as a computer monitor, a flat-panel display, a digital projector, a printer, or other type of output device.

EXAMPLE CLAUSES

1. A method for determining a reduction of a pathogen within a food product being treated, the method comprising: receiving, from a device within a facility where the food product is being treated, and during treatment of the food product, data associated with the treatment of the food product; determining, based at least in part on the data, and using a model, a log reduction value associated with the food product with respect to the pathogen; and classifying, based at least in part on the log reduction value, the food product as safe or unsafe with respect to the pathogen.

2. The method of clause 1, wherein the classifying of the food product comprises: determining that the log reduction value satisfies a threshold; and classifying the food product as safe with respect to the pathogen based at least in part on the log reduction value satisfying the threshold.

3. The method of clause 1 or 2, further comprising: generating a report that indicates a safety of the food product with respect to the pathogen; and sending the report to a user associated with a food processing entity that operates the facility.

4. The method of any one of clauses 1 to 3, further comprising: generating a dataset based at least in part on the data; and selecting, based at least in part on analyzing the dataset, a set of model parameters from multiple available model parameters for use in the determining of the log reduction value.

5. A system comprising: one or more processors; and memory storing computer-executable instructions that, when executed by the one or more processors, cause performance of operations comprising: receiving data associated with treatment of a food product; determining, based at least in part on the data, and using a model, a value associated with the food product with respect to a pathogen; and classifying, based at least in part on the value, the food product as a class label indicative of a safety of the food product with respect to the pathogen.

6. The system of clause 5, wherein the value is a log reduction value, and the classifying of the food product comprises: determining that the log reduction value satisfies a threshold; and classifying, based at least in part on the log reduction value satisfying the threshold, the food product as the class label indicating that the food product is safe with respect to the pathogen.

7. The system of clause 5 or 6, wherein the data is first data received over a first period of time during the treatment of the food product, and wherein the value is a first value, the operations further comprising: determining that the treatment has not completed; receiving second data over a second period of time during the treatment of the food product, the second period of time subsequent to the first period of time; and determining, based at least in part on the second data, a second value associated with the food product with respect to the pathogen, wherein the classifying of the food product is based at least in part on the first value and the second value.

8. The system of any one of clauses 5 to 7, the operations further comprising: generating a report comprising an indication of the safety of the food product with respect to the pathogen; and sending the report to a user associated with a food processing entity.

9. The system of clause 8, wherein the indication of the safety of the food product with respect to the pathogen comprises at least one of the class label or the log reduction value.

10. The system of any one of clauses 5 to 9, the operations further comprising sending an alert to a user associated with a food processing entity based at least in part on the class label.

11. The system of clause 10, wherein the alert comprises a recommendation regarding the treatment of the food product.

12. The system of any one of clauses 5 to 11, the operations further comprising causing, based at least in part on the value, a device involved in the treatment of the food product to adjust a parameter of the treatment.

13. The system of any one of clauses 5 to 12, wherein the treatment comprises at least one of heat treatment, pressure treatment, or chemical treatment.

14. A method comprising: receiving data associated with treatment of a food product; providing the data as input to a model; and classifying, based at least in part on output from the model, the food product as a class label indicative of a safety of the food product with respect to a pathogen.

15. The method of clause 14, wherein: the model comprises a mathematical model associated with the food product; and the output from the mathematical model comprises a log reduction value associated with the food product with respect to the pathogen.

16. The method of clause 15, wherein the classifying of the food product comprises: determining that the log reduction value fails to satisfy a threshold; and classifying, based at least in part on the log reduction value failing to satisfy the threshold, the food product as the class label indicating that the food product is unsafe with respect to the pathogen.

17. The method of any one of clauses 14 to 16, wherein the model comprises a trained machine learning model.

18. The method of any one of clauses 14 to 17, further comprising: generating a report comprising the class label; and sending the report to a user associated with a food processing entity.

19. The method of any one of clauses 14 to 18, further comprising sending an alert to a user associated with a food processing entity based at least in part on the class label.

20. The method of any one of clauses 14 to 19, further comprising causing, based at least in part on the log reduction value, a device involved in the treatment of the food product to adjust a parameter of the treatment.

21. A method for determining a reduction of a contaminant within an ingestible product being treated, the method comprising: receiving, from a device within a facility where the ingestible product is being treated, and during treatment of the ingestible product, data associated with the treatment of the ingestible product; determining, based at least in part on the data, and using a model, a log reduction value associated with the ingestible product with respect to the contaminant; and classifying, based at least in part on the log reduction value, the ingestible product as safe or unsafe with respect to the contaminant.

22. The method of clause 21, wherein the classifying of the ingestible product comprises: determining that the log reduction value satisfies a threshold; and classifying the ingestible product as safe with respect to the contaminant based at least in part on the log reduction value satisfying the threshold.

23. The method of clause 21 or 22, further comprising: generating a report that indicates a safety of the ingestible product with respect to the contaminant; and sending the report to a user associated with an entity that operates the facility.

24. The method of any one of clauses 21 to 23, further comprising: generating a dataset based at least in part on the data; and selecting, based at least in part on analyzing the dataset, a set of model parameters from multiple available model parameters for use in the determining of the log reduction value.

25. A system comprising: one or more processors; and memory storing computer-executable instructions that, when executed by the one or more processors, cause performance of operations comprising: receiving data associated with treatment of an ingestible product; determining, based at least in part on the data, and using a model, a value associated with the ingestible product with respect to a contaminant; and classifying, based at least in part on the value, the ingestible product as a class label indicative of a safety of the ingestible product with respect to the contaminant.

26. The system of clause 25, wherein the value is a log reduction value, and the classifying of the ingestible product comprises: determining that the log reduction value satisfies a threshold; and classifying, based at least in part on the log reduction value satisfying the threshold, the ingestible product as the class label indicating that the ingestible product is safe with respect to the contaminant.

27. The system of clause 25 or 26, wherein the data is first data received over a first period of time during the treatment of the ingestible product, and wherein the value is a first value, the operations further comprising: determining that the treatment has not completed; receiving second data over a second period of time during the treatment of the ingestible product, the second period of time subsequent to the first period of time; and determining, based at least in part on the second data, a second value associated with the ingestible product with respect to the contaminant, wherein the classifying of the ingestible product is based at least in part on the first value and the second value.

28. The system of any one of clauses 25 to 27, the operations further comprising: generating a report comprising an indication of the safety of the ingestible product with respect to the contaminant; and sending the report to a user associated with an entity.

29. The system of clause 28, wherein the indication of the safety of the ingestible product with respect to the contaminant comprises at least one of the class label or the log reduction value.

30. The system of any one of clauses 25 to 29, the operations further comprising sending an alert to a user associated with an entity based at least in part on the class label.

31. The system of clause 30, wherein the alert comprises a recommendation regarding the treatment of the ingestible product.

32. The system of any one of clauses 25 to 31, the operations further comprising causing, based at least in part on the value, a device involved in the treatment of the ingestible product to adjust a parameter of the treatment.

33. The system of any one of clauses 25 to 32, wherein the treatment comprises at least one of heat treatment, pressure treatment, or chemical treatment.

34. A method comprising: receiving data associated with treatment of an ingestible product; providing the data as input to a model; and classifying, based at least in part on output from the model, the ingestible product as a class label indicative of a safety of the ingestible product with respect to a contaminant.

35. The method of clause 34, wherein: the model comprises a mathematical model associated with the ingestible product; and the output from the mathematical model comprises a log reduction value associated with the ingestible product with respect to the contaminant.

36. The method of clause 35, wherein the classifying of the ingestible product comprises: determining that the log reduction value fails to satisfy a threshold; and classifying, based at least in part on the log reduction value failing to satisfy the threshold, the ingestible product as the class label indicating that the ingestible product is unsafe with respect to the contaminant.

37. The method of any one of clauses 34 to 36, wherein the model comprises a trained machine learning model.

38. The method of any one of clauses 34 to 37, further comprising: generating a report comprising the class label; and sending the report to a user associated with an entity.

39. The method of any one of clauses 34 to 38, further comprising sending an alert to a user associated with an entity based at least in part on the class label.

40. The method of any one of clauses 34 to 39, further comprising causing, based at least in part on the log reduction value, a device involved in the treatment of the ingestible product to adjust a parameter of the treatment.

41. A method comprising: collecting, by a first device, from a second device involved in treating a food product within a facility, data associated with treatment of the food product; determining, by the first device, that an error is not detected in association with the data; generating, by the first device, messages containing a communication status; sending, by the first device, the messages to a computing system over a network.

42. The method of clause 41, further comprising: determining, by the first device, that a production sequence is ongoing; generating, by the first device, second messages containing the data; sending, by the first device, the second messages to the computing system over the network.

43. A method comprising: receiving messages containing data associated with treatment of a food product; determining at least one of: that the messages are associated with a known sequence; or that the messages are not associated with a known sequence and that required information is set; saving the data; determining that an end of a sequence has been reached; generating a data set for the sequence based on the messages; analyzing the data set to determine a type of algorithm and/or associated parameters to utilize; determining a conformity indicator value associated with the food product with respect to a pathogen using the type of algorithm and/or the associated parameters; determining whether the conformity indicator value or a confidence level indicator associated with the conformity indicator satisfies a threshold; classifying the food product as unsafe with respect to the pathogen based on determining that the threshold is not satisfied; classifying the food product as safe with respect to the pathogen based on determining that the threshold is satisfied; generating a report associated with the food product, the report including a class label for the food product indicative of a safety of the food product; and notifying a user associated with a food processing entity about an availability of the report.

44. A method comprising: receiving messages containing data associated with treatment of a food product; determining at least one of: that the messages are associated with a known sequence; or that the messages are not associated with a known sequence and that required information is set; saving the data; generating a data set for a running sequence based on a portion of available data contained in the messages; analyzing the data set to determine a type of algorithm and/or associated parameters to utilize; determining a conformity indicator value associated with the food product with respect to a pathogen using the type of algorithm and/or the associated parameters; determining that the conformity indicator value or a confidence level indicator associated with the conformity indicator does not satisfy a threshold; and sending an alert to a user associated with a food processing entity based on determining that the threshold is not satisfied.

45. A method comprising: receiving messages containing data associated with treatment of a food product; determining that the messages are not associated with a known sequence; initializing a production sequence; determining that required information is not set; sending a notification to an operator of a food treatment process.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the disclosed techniques and systems in diverse forms thereof.

As will be understood by one of ordinary skill in the art, each implementation disclosed herein can comprise, consist essentially of or consist of its particular stated element, step, or component. Thus, the terms "include" or "including" should be interpreted to recite: "comprise, consist of, or consist essentially of" The transition term "comprise" or "comprises" means has, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the implementation to the specified elements, steps, ingredients or components and to those that do not materially affect the implementation. As used herein, the term "based on" is equivalent to "based at least partly on," unless otherwise specified.

What is claimed is:

1. A method for determining a reduction of a pathogen within a food product being treated, the method comprising:

receiving, by a computing system, over a network, from a gateway device within a facility where the food product is being treated, and during heat treatment of the food product, a series of messages containing data associated with the heat treatment of the food product, wherein the data comprises at least temperature data and time data, and wherein the series of messages are associated with a sequence that corresponds to at least one of the heat treatment of the food product or a stage of the heat treatment;

determining, by the computing system receiving an end message in the series of messages, that an end of the sequence has been reached;

in response to the determining that the end of the sequence has been reached:

generating, by the computing system, a dataset for the sequence based at least in part on the data; and based at least in part on analyzing the dataset to identify a type of the food product, a program used to treat the food product, or equipment being used to treat the food product, selecting, by the computing system, a set of model parameters from multiple available model parameters, the set of model parameters comprising a first value representing a reference temperature, a second value representing a number of degrees of a Thermal Death Time (TDT) curve to traverse 1 log cycle, and a third value representing a number of minutes for 1-log reduction of a microbial population at the reference temperature;

determining, by the computing system, based at least in part on a measured temperature extracted from the temperature data and a measured time extracted from the time data, and using a mathematical model that defines one or more equations including the set of model parameters, a log reduction value associated with the food product with respect to the pathogen;

classifying, by the computing system, based at least in part on the log reduction value, the food product as safe with respect to the pathogen;

sending, by the computing system, over the network, to the gateway device, an instruction to cause a programmable logic controller (PLC) involved in the heat treatment of the food product to stop the heat treatment; and causing, by the gateway device, based at least in part on the instruction, the PLC to stop the heat treatment by controlling a temperature inside a sterilizer tank containing the food product.

2. The method of claim 1, wherein the classifying of the food product comprises:

determining that the log reduction value satisfies a threshold; and classifying the food product as safe with respect to the pathogen based at least in part on the log reduction value satisfying the threshold.

3. The method of claim 1, further comprising:

generating a report that indicates a safety of the food product with respect to the pathogen; and sending the report to a user associated with a food processing entity that operates the facility.

4. The method of claim 1, wherein:

the set of model parameters are selected based on an identification, from the dataset, of the type of the food product.

5. The method of claim 1, wherein the data is first data received over a first period of time during the heat treatment of the food product, and wherein the log reduction value is a first log reduction value, the method further comprising:

determining that the heat treatment has not completed;

receiving second data over a second period of time during the heat treatment of the food product, the second period of time subsequent to the first period of time; and determining, based at least in part on the second data, a second log reduction value associated with the food product with respect to the pathogen, wherein the classifying of the food product is based at least in part on the first log reduction value and the second log reduction value.

6. The method of claim 1, further comprising sending an alert to a user associated with a food processing entity based at least in part on the classifying.

7. The method of claim 6, wherein the alert comprises a recommendation regarding the heat treatment of the food product.

8. The method of claim 1, wherein the one or more equations comprise an equation to compute a lethal rate based at least in part on the first value representing the reference temperature, the second value representing the number of degrees of the TDT curve to traverse 1 log cycle, and the measured temperature extracted from the temperature data.

9. The method of claim 8, wherein the equation is a first equation, and wherein the one or more equations comprise a second equation to compute a lethality based at least in part on the lethal rate and the measured time extracted from the time data.

10. The method of claim 1, wherein:
the set of model parameters are selected based on an identification, from the dataset, of the equipment being used to treat the food product.

11. A method comprising:
receiving, by a computing system, over a network, from a gateway device within a facility, a series of messages containing data associated with heat treatment of a food product, wherein the data comprises at least temperature data and time data, and wherein the series of messages are associated with a sequence that corresponds to at least one of the heat treatment of the food product or a stage of the heat treatment;
determining, by the computing system receiving an end message in the series of messages, that an end of the sequence has been reached;
in response to the determining that the end of the sequence has been reached:
generating, by the computing system, a dataset for the sequence based at least in part on the data; and
based at least in part on analyzing the dataset to identify a type of the food product, a program used to treat the food product, or equipment being used to treat the food product, selecting, by the computing system, a set of model parameters from multiple available model parameters, the set of model parameters comprising a first value representing a reference temperature, a second value representing a number of degrees of a Thermal Death Time (TDT) curve to traverse 1 log cycle, and a third value representing a number of minutes for 1-log reduction of a microbial population at the reference temperature;
providing, by the computing system, a measured temperature extracted from the temperature data and a measured time extracted from the time data as input to a mathematical model that defines one or more equations including the set of model parameters;
classifying, by the computing system, based at least in part on a log reduction value output from the mathematical model, the food product as a class label indicating that the food product is safe with respect to a pathogen;
sending, by the computing system, over the network, to the gateway device, an instruction to cause a programmable logic controller (PLC) involved in the heat treatment of the food product to stop the heat treatment; and causing, by the gateway device, based at least in part on the instruction, the PLC to stop the heat treatment by controlling a temperature inside a sterilizer tank containing the food product.

12. The method of claim 11, wherein the classifying of the food product comprises:
determining that the log reduction value satisfies a threshold; and
classifying, based at least in part on the log reduction value satisfying the threshold, the food product as the class label indicating that the food product is safe with respect to the pathogen.

13. The method of claim 11, further comprising:
generating a report comprising the class label; and
sending the report to a user associated with a food processing entity.

14. The method of claim 11, further comprising sending an alert to a user associated with a food processing entity based at least in part on the class label.

15. The method of claim 14, wherein the alert comprises a recommendation regarding the heat treatment of the food product.

16. The method of claim 11, wherein the data is first data received over a first period of time during the heat treatment of the food product, and wherein the log reduction value output from the mathematical model is a first log reduction value, the method further comprising:
determining that the heat treatment has not completed;
receiving second data over a second period of time during the heat treatment of the food product, the second period of time subsequent to the first period of time; and
providing the second data as input to the mathematical model to generate a second log reduction value,
wherein the classifying of the food product is based at least in part on the first log reduction value and the second log reduction value.

17. The method of claim 11, wherein:
the set of model parameters are selected based on an identification, from the dataset, of the type of the food product.

18. The method of claim 11, wherein the one or more equations comprise an equation to compute a lethal rate based at least in part on the first value representing the reference temperature, the second value representing the number of degrees of the TDT curve to traverse 1 log cycle, and the measured temperature extracted from the temperature data.

19. The method of claim 18, wherein the equation is a first equation, and wherein the one or more equations comprise a second equation to compute a lethality based at least in part on the lethal rate and the measured time extracted from the time data.

20. The method of claim 11, wherein:
the set of model parameters are selected based on an identification, from the dataset, of the equipment being used to treat the food product.

* * * * *